(12) United States Patent
Carpenter et al.

(10) Patent No.: US 10,373,276 B2
(45) Date of Patent: Aug. 6, 2019

(54) SELF-SERVE PRODUCT DISPENSER

(71) Applicant: THE COCA-COLA COMPANY, Atlanta, GA (US)

(72) Inventors: Gregg Carpenter, Marietta, GA (US); David Roy Newman, Atlanta, GA (US); Arthur G. Rudick, Atlanta, GA (US); Anisha Joshi, Atlanta, GA (US); David O. Slagley, Roswell, GA (US); Michael Edward Hopkins, Atlanta, GA (US)

(73) Assignee: THE COCA-COLA COMPANY, Atlanta, GA (US)

(*) Notice: Subject to any disclaimer, the term of this patent is extended or adjusted under 35 U.S.C. 154(b) by 117 days.

(21) Appl. No.: 15/126,095

(22) PCT Filed: Mar. 31, 2015

(86) PCT No.: PCT/US2015/023522
§ 371 (c)(1),
(2) Date: Sep. 14, 2016

(87) PCT Pub. No.: WO2015/153565
PCT Pub. Date: Oct. 8, 2015

(65) Prior Publication Data
US 2017/0186110 A1 Jun. 29, 2017

Related U.S. Application Data

(60) Provisional application No. 61/973,199, filed on Mar. 31, 2014.

(51) Int. Cl.
*G06Q 50/12* (2012.01)
*G07F 13/06* (2006.01)
(Continued)

(52) U.S. Cl.
CPC .......... *G06Q 50/12* (2013.01); *G06K 7/1413* (2013.01); *G06Q 20/045* (2013.01); *G06Q 20/18* (2013.01);
(Continued)

(58) Field of Classification Search
CPC ...... G06Q 50/12; G06Q 20/208; G06Q 20/18; G06Q 20/202; G06Q 30/1085; G06K 7/1413; G07F 13/065
(Continued)

(56) References Cited

U.S. PATENT DOCUMENTS 7,439,859 B2 * 10/2008 Humphrey ........... G06Q 20/105
  222/1
7,455,867 B1 * 11/2008 Gutwein ............... A23F 5/243
  426/433

(Continued)

FOREIGN PATENT DOCUMENTS

WO       2009032941 A2    3/2009

OTHER PUBLICATIONS

Lee, Myung Jin; International Search Report & Written Opinion; dated Jun. 30, 2015, pp. 1-11; Korean Intellectual Property Office, Daejeon Metropolitan City, Republic of Korea.
(Continued)

*Primary Examiner* — Michael Collins

(57) ABSTRACT

Embodiments and associated aspects of the disclosure permit regulation of dispense of a product in a self-serve environment via, at least in part, reconciliation of a product order originated in an access device, such as a point-of-sale (POS) device, and a product selection effected at a product dispenser configured to fulfill the product order.

10 Claims, 17 Drawing Sheets

(51) Int. Cl.
*G06Q 30/00* (2012.01)
*G06K 7/14* (2006.01)
*G06Q 20/20* (2012.01)
*G06Q 20/18* (2012.01)
*G06Q 20/04* (2012.01)
*G06Q 20/40* (2012.01)

(52) U.S. Cl.
CPC ......... *G06Q 20/202* (2013.01); *G06Q 20/208* (2013.01); *G06Q 20/40145* (2013.01); *G06Q 30/0185* (2013.01); *G07F 13/065* (2013.01)

(58) Field of Classification Search
USPC ................................................. 700/231–244
See application file for complete search history.

(56) References Cited

U.S. PATENT DOCUMENTS

| | | | | |
|---|---|---|---|---|
| 8,565,916 | B2* | 10/2013 | Zhang | B67D 1/0888 700/235 |
| 8,739,840 | B2* | 6/2014 | Mattos, Jr. | B67D 1/0888 141/94 |
| 8,768,505 | B2* | 7/2014 | Thompson | G06Q 30/06 700/236 |
| 8,972,048 | B2* | 3/2015 | Canora | G06Q 20/3278 700/237 |
| 9,708,170 | B2* | 7/2017 | Segiet | B67D 1/0888 |
| 2005/0087255 | A1* | 4/2005 | Humphrey | A47G 19/2227 141/94 |
| 2007/0215239 | A1* | 9/2007 | Dorney | A47G 19/2227 141/94 |
| 2008/0195251 | A1* | 8/2008 | Milner | B67D 3/0035 700/237 |
| 2008/0257948 | A1 | 10/2008 | Jochim et al. | |
| 2009/0001177 | A1* | 1/2009 | Smith | G06Q 20/10 235/494 |
| 2009/0272274 | A1 | 11/2009 | De Graaff et al. | |
| 2010/0108755 | A1* | 5/2010 | Fuerstenberg | G06Q 20/20 235/375 |
| 2010/0125362 | A1* | 5/2010 | Canora | G06Q 20/3278 700/236 |
| 2011/0114647 | A1* | 5/2011 | Hallberg | A47G 19/2227 220/592.17 |
| 2013/0048717 | A1 | 2/2013 | Brendell et al. | |
| 2013/0282451 | A1 | 10/2013 | Moore et al. | |

OTHER PUBLICATIONS

Anastosov, Yuliyan; European Search Report; dated Oct. 10, 2017; pp. 1-10; European Patent Office, Munich, Germany.

* cited by examiner

SELF-SERVE PRODUCT DISPENSER

CROSS-REFERENCE TO RELATED APPLICATIONS

This application is being filed on Sep. 14, 2016 as a national stage application based on PCT International Patent application Number PCT/US2015/023522 filed Mar. 31, 2015 and claims priority to U.S. Provisional patent application No. 61/973,199, filed Mar. 31, 2014, the entire disclosures of which are incorporated by reference in their entirety.

BACKGROUND

Conventional self-serve beverage dispensers typically permit providing consumers with a purchased beverage based on a consumer's selection. Yet, such a selection and associated beverage dispense may not be congruent or otherwise consistent with the purchased beverage. Even when there is congruency or consistency between the selection and the purchased beverage, the generally non-monitored operation of conventional self-serve beverage dispensers may result in indiscriminate refills of a selected beverage.

BRIEF DESCRIPTION OF THE DRAWINGS

The accompanying drawings form part of the disclosure and are incorporated into the subject specification. The drawings illustrate example embodiments of the disclosure and, in conjunction with this description and claims, serve to explain, at least in part, various principles, features, or aspects of the disclosure. Certain embodiments of the disclosure are described more fully below with reference to the accompanying drawings. However, various aspects of the disclosure can be implemented in many different forms and should not be construed as being limited to the implementations set forth herein. Like numbers refer to like elements throughout.

DETAILED DESCRIPTION

Figure 1:
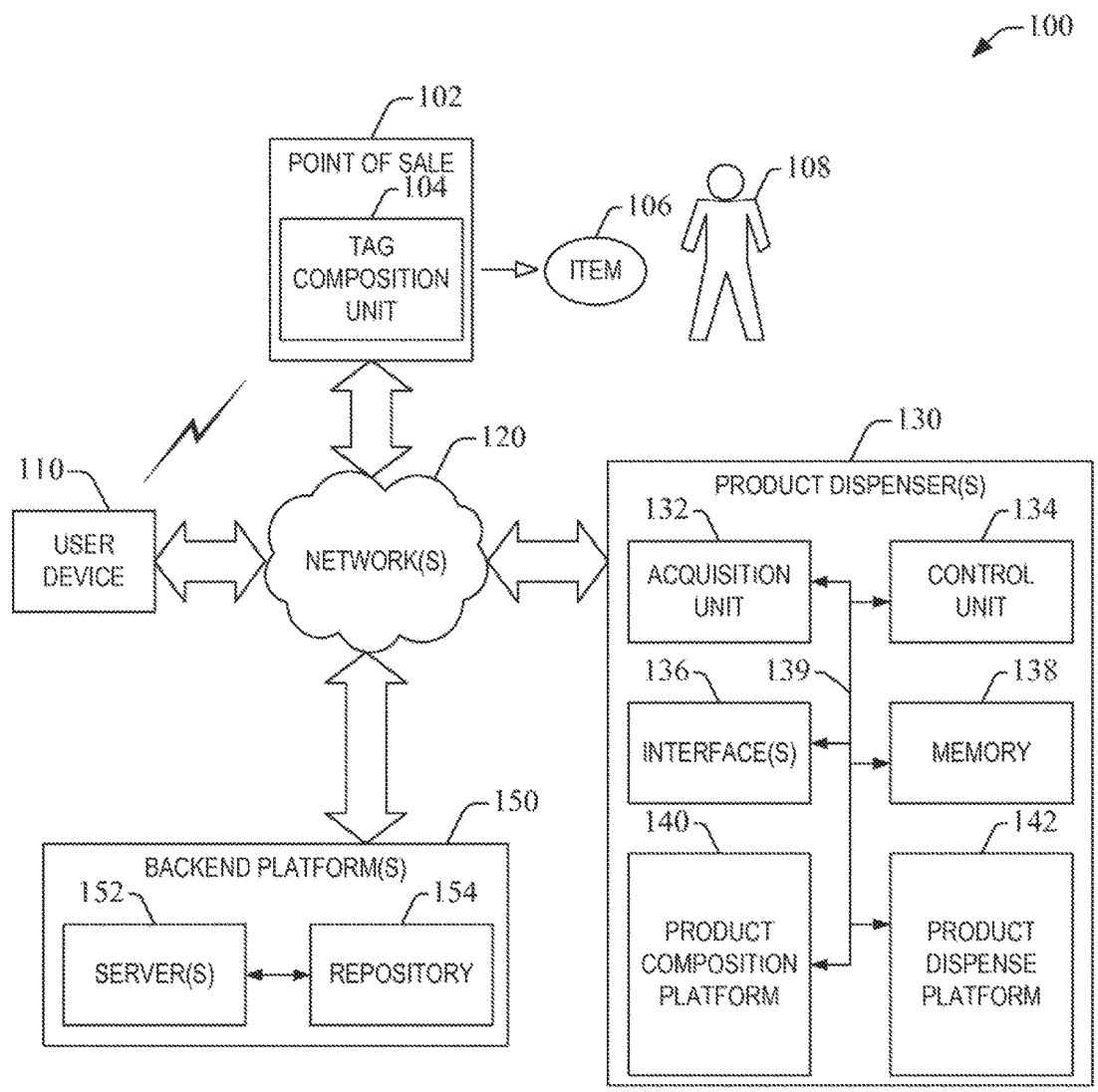
FIG. 1 illustrates an example self-serve environment for dispense of a product in accordance with one or more embodiments of the disclosure.

Certain embodiments of the disclosure recognize and address the lack of regulation of access and product dispense at product dispensers that are operated in self-serve mode by a consumer. Certain embodiments of the disclosure can permit regulation of a product dispense in a self-serve environment via, at least in part, reconciliation of a product order originated in an access device, such as a point-of-sale (POS) device, and a product selection effected at a product dispenser configured to fulfill the product order. The product order can permit rich customization of a desired product, and can establish a permissible configuration for product dispense. The product order can be conveyed to the product dispenser, which can receive a product selection associated with the product order, and can determine validity of the product selection based at least in part on such a permissible configuration for product dispense. For a valid product selection, the product dispenser can dispense a selected product within the bounds of the product order. In some embodiments, the product order and/or an index and/or code associated with the product order can be conveyed to the product dispenser, which can ascertain the validity or invalidity of the product order, index, and/or code. In response to a valid product order, index, and/or the code, the product dispenser can permit or otherwise unlock valid product selections associated with the product order. In one example, unlocked product selection(s) can be presented via a graphical user interface associated with (e.g., integrated into or functionally coupled to) the product dispenser, and the product dispenser can dispense a beverage selected from the unlocked product selection(s).

Certain embodiments of the disclosure can provide various distinguishing features over conventional self-serve dispensing technologies. One example feature is that product pricing and/or serving size (also referred to as portion size) can be flexibly regulated according to operational conditions of the self-serve dispenser, or can be customized or otherwise flexibly adjusted to a consumer. Another example feature is that the dispensing of high-value products can be limited or otherwise regulated. Yet another example feature is that a premium can be assessed for value-added options. Still another feature is that product dispensing can be associated to one or more consumer services and/or consumer incentivation programs (e.g. loyalty programs, promotions (such as sweepstakes), a combination thereof, or the like). A further example feature is that product dispensing can retain the benefits of consumer engagement of a self-serve product dispenser, while containing risk and uncertainty associated with refills and up-serve (e.g., dispensing a beverage priced at a higher price point than the beverage actually purchased).

Embodiments described herein may facilitate control over a volume of beverages dispensed to consumers by limiting a number of refills, a time in which a refill may be dispensed, a total volume of beverage dispensed for a particular beverage vessel, and/or other criteria.

Referring to the drawings, FIG. 1 illustrates an example self-serve environment 100 for dispense of a product in accordance with one or more embodiments of the disclosure. As illustrated, the example self-serve environment 100 can include a point of sale (POS) device 102 (also referred to as point of sale 102) that can receive information from a consumer 108 or a user device 110. The information can include order information associated with (e.g., indicative or otherwise representative of) a product order for a product that can be provided by one or more product dispensers 130. The order information can include a group of information structures that characterize or otherwise represent the product that is ordered and/or permit regulation of dispense of the product. In certain embodiments, an information structure can include a parameter of a specific type, such as a logic type parameter, a numeric type parameter, a string type, a combination thereof, or the like. The group of information structures can include one or more information structures respectively or collectively indicative of product type, a product size, a product amount (e.g., portion size), price point (or price level), an allowance for repeated or otherwise iterative product dispense, a product add-in, a combination thereof, or the like. In addition, the group of information structures can include one or more information structures indicative or otherwise representative of product delivery regulations or restrictions.

In the self-serve environment 100, a product associated with a product order can be pre-paid. In certain embodiments, the POS 102 can receive payment information for the product based at least in part the product order. In such embodiments, the order information and/or payment information can be supplied via one or more network(s) 120. In one example, the network(s) 120 can comprise wireless networks and/or wireline networks, having different spatial scope or network footprint, e.g., personal area network(s), home area network(s), local area network(s) (LAN(s)), metropolitan area network(s) (MAN(s)), wide area network(s) (WAN(s)), deep-space network(s) (such as satellite network(s)), a combination thereof, or the like. It should be appreciated that the network(s) 120 can be deployed at specific location(s) and can have specific coverage scope that can be commensurate with the spatial scope. Communication (e.g., transmission, reception, and/or exchange of information) between one or more of the network(s) 120 and the POS 102 or any other functional element of the example operational environment 100 can be achieved via traffic and signaling pipe(s) (represented with arrows in FIG. 1, for example) that functionally couple a functional element (e.g., POS 102, product dispenser(s) 130, user device 110, backend platform(s) 150, component(s) thereof, combinations thereof, or the like) and at least one of the one or more of the network(s) 120 or a component thereof. In one example, traffic and signaling pipe(s) 144 can be embodied in or can comprise wireline link(s) and/or wireless link(s) and/or several network elements (such as routers or switches, concentrators, servers, and the like) that may form one or more reference links. In addition, a link can include a downstream link (DL) and/or an upstream link (UL), and can be embodied in wired link(s) (e.g., an optic-fiber cable, a cat5 cable, a DSL link, a switch, a router, a gateway, a combination thereof, or the like), wireless link(s) (which can include terrestrial air interfaces and/or deep-space link(s)), or a combination thereof. A wireless link can be configured in accordance with a specific radio technology protocol that can permit wireless communication between two or more electronic computing devices in accordance with this disclosure.

A specific combination of order information structures that characterize or otherwise represent the product order can establish a price point (or price level) for the product. Such a price point can determine an upper bound for the products that can be dispensed in response to fulfilling the product order. A product dispenser in accordance with certain embodiments of the disclosure can dispense products having respective price points that are lower than the price point of an ordered product. Such upper-bounded order fulfillment may be referred to as "order down-fulfillment."

In certain example scenarios, a product order can specify a product according to product type and product amount, and the price point for the product can be established accordingly. For example, the product order can include 12 fluid ounces of non-premium or regular juice (premium juice will not dispense). For another example, the product order can include 12 fluid ounces of premium juice (either regular or premium juice can be dispensed). For yet another example, the product order can include 12 fluid ounces of regular juice and 12 fluid ounces of premium juice. In other example scenarios, a product order can specify a product according to product type, product amount, and product add-ins: for example, one medium smoothie and up to three fresh fruit add-ins. Smoothies having smaller portion size and less than three fresh fruit add-ins can be dispensed in such an order. In other example scenarios, a product order can specify a product according to product type, product amount, and an allowance for iterative dispense. For example, the product order can include 120 fluid ounces of juice that are permitted to be dispensed in six-ounce increments at a certain time (e.g. a specific date or set of hours) or at multiple times (e.g., a plurality of specific dates). For another example, the product order can include 10 large carbonated drinks that are permitted to be dispensed at a certain time (e.g. a specific date) or at multiple times (e.g., a plurality of specific dates). In still other example scenarios, a product order can specify a product according to an allowance for iterative dispense, e.g., the product order can include unlimited dispense of beverages (informally referred to as "all you can drink") for one hour. In other example scenarios, a product order can convey that product add-ins are unavailable or can specify available product add-ins (e.g., core brands or a subset of core brands are available; a specific number of add-ins are available; such as cherry and vanilla flavored brands in addition to the core brands; all add-ins are available, such as all flavored brands and core brands are available; and the like) or absence thereof (e.g., no add-ins are available). For instance, the product order can specify available types of product add-ins (e.g., flavor add-ins are available, but not nutraceuticals; all types of add-ins are available; and the like).

Figure 2A:
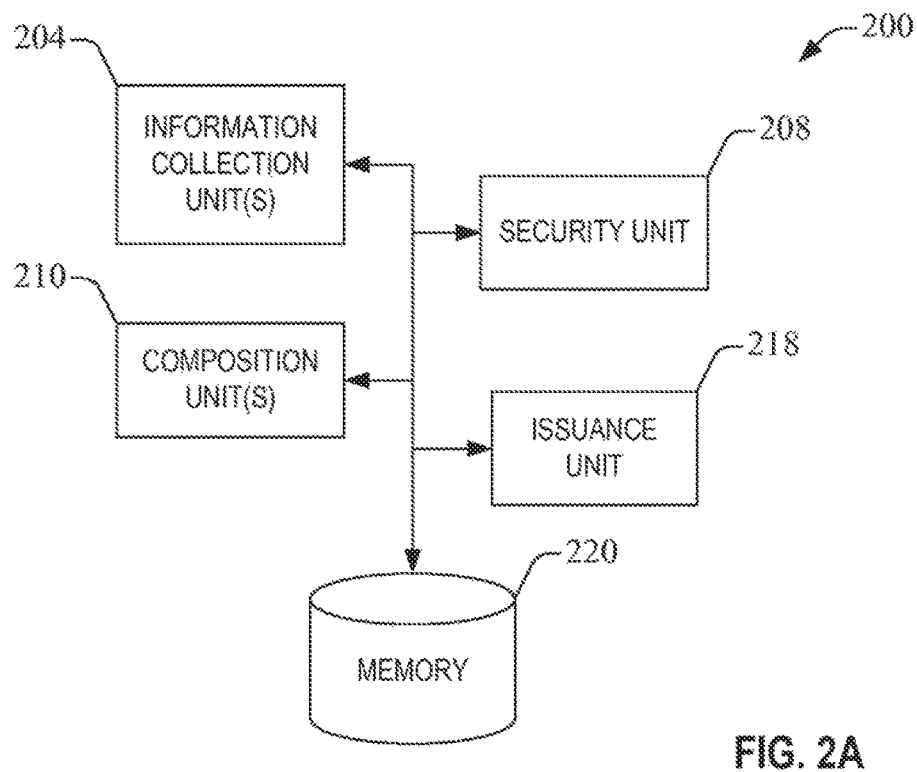
FIGS. 2A-2B illustrate example point of sale (POS) devices in accordance with one or more embodiments of the disclosure.
Figure 2B:
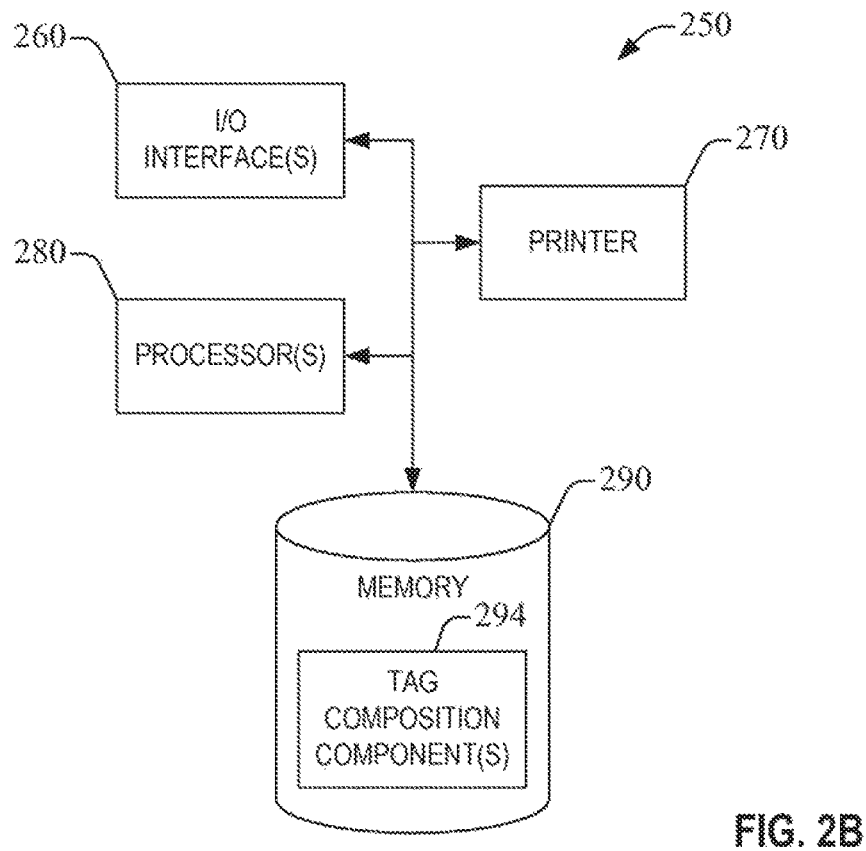

A product order in the example self-serve environment 100 can be supplied anonymously. Yet, in certain scenarios, the information received at the POS 102 can include consumer information that characterizes or otherwise is representative of the consumer 108, and the product order can be associated or otherwise linked to the consumer information. To at least such an end, in one implementation, the POS 102 can acquire or otherwise receive at least a portion of the consumer information from a device (computing or non-computing) associated with the consumer 108. In addition or in the alternative, in another implementation, the POS 102 can acquire (e.g., receive, request, request and receive) additional consumer information based at least in part on the portion of the consumer information received from such a device. For example, in the illustrated embodiment, the POS 102 can access, via a network (e.g., one of network(s) 120), a remote information storage (e.g., a repository 154) that can contain a variety of consumer information. The POS 102 can leverage or otherwise utilize the portion of the consumer information (e.g., an alphanumeric code) to obtain the additional consumer information from the remote information storage (e.g., database retained in memory). In order to associate the consumer information with the product order, the POS 102 can augment the product order with one or more information structures indicative or otherwise representative of the consumer information. In certain embodiments, such as example embodiment 200 illustrated in FIG. 2A, the POS 102 can include one or more information collection units 204 that can receive at least a portion of the consumer information. The information collection unit(s) 204 can include a touch-screen display, a camera, a keyboard, a keypad, a wearable device or wearable computer device, a gesture capture or detection device, a microphone, a voice recognition device, a reader device (such as a near-field communication (NFC) device), a biometric sensor, a combination thereof, and the like. In other embodiments of a POS, such as embodiment 250 illustrated in FIG. 2B, at least one of the information collection unit(s) 204 may be embodied in or can constitute one or more I/O interfaces 260.

Consumer information received at the POS 102 can preserve anonymity of the consumer 108, and can permit consumer-specific customization of a product order and associated consumer interaction with a product dispenser configured to fulfill the product order. In one embodiment, a code (e.g., numeric, alphabetic, alphanumeric, graphic, or the like) can be printed or otherwise embedded on a consumer's receipt or other carrier medium associated with the consumer 108. The product dispenser can require the consumer to provide (e.g., to input) the code prior to providing a product selection and/or dispensing a selected product. In another embodiment, the consumer information can include information indicative of a demographic feature of the consumer, such as gender, age, ethnic background, a combination thereof, or the like. In another embodiment, the consumer information can include information indicative of restriction of access to products, such as a consumption restriction of a product (e.g., a parental control that limits or prevents consumption of certain products, such as caffeinated or alcoholic beverages) or a dietary restriction associated with specific products. Association of a dietary restriction to a product order can prevent dispense of products containing ingredients inadequate for a consumer associated with the product order, e.g., a consumer who is lactose-intolerant, a consumer who is diabetic, or the like. In yet another embodiment, the consumer information can include information indicative of a loyalty program or other incentivation program(s), such as "My Coke Rewards." Association of the product order to an incentivation program can permit the consumer 108 to receive an increasingly richer dispense experience, e.g., based on product consumption, the consumer 108 can access increasing privilege levels that can permit the consumer 108 to access one or more of product discounts, free-of-charge dispenses, premium products at regular prices, special products (e.g., novelty beverages) only available at higher privilege levels; extra and/or special add-ins (e.g. fresh fruit pieces or extra pulp), a combination thereof, or the like.

The disclosure contemplates non-anonymous association of consumer information to a product order. In certain embodiments, the product order can be associated to biometric information pertaining to the consumer. The POS 102 can acquire at least a portion of the biometric information, and acquisition of such information can include scanning of a fingerprint of a consumer, scanning of a retina of the consumer, recording of a consumer's utterance or speech, identification of a facial feature of the consumer, measurement of the consumer's height, measurement of the consumer's weight, measurement of the consumer's blood pressure, measurement of the consumer's cholesterol level, measurement of the consumer's heart rate, measurement of the consumer's body temperature, measurement of the consumer's bone density, measurement of the consumer's insulin level, a combination thereof, or the like. A dispenser of the product dispenser(s) 130 that access the order information can be configured to access such biometric information. In one example, various devices (e.g., a camera, a scale, a scanner, a combination thereof, or the like) can be functionally coupled to the POS 102 to enable this functionality.

The consumer 108 can cause a dispenser of the product dispenser(s) 130 to dispense a product autonomously (which also may be referred to as self-serve modality) based at least in part on a product order for the product. Such a dispense can represent fulfillment of the product order. In the self-serve environment 100, one or more product dispensers 130 can fulfill the product order. A dispenser of the product dispenser(s) 130 can be deployed in a confined environment, such as a restaurant or any other hospitality service facility. In a scenario in which the product dispenser(s) 130 include a plurality of dispensers, such dispensers can be geographically distributed and at least a portion (e.g., one dispenser, two dispenser, more than two dispenser, each dispenser) of the plurality of dispenser can fulfill the product order. For instance, the plurality of product dispensers can be distributed within a restaurant or within participating restaurants of a restaurant chain. It should be appreciated that, in one aspect, the product dispenser(s) 130 can form a network and the product order can be fulfilled at any dispenser of such a network.

In order to at least dispense the product autonomously, in one aspect, the POS 102 can provide (e.g., generate, deliver, generate and deliver, or the like) a machine-accessible item 106 (also referred to as item 106) having encoded thereon at least a portion of the order information. At least the portion of the order information can be securely encoded according to various secure encoding schemes, such as encryption, scrambling, a combination thereof, or the like. As illustrated, the POS 102 can include a tag composition unit 104 that may configure the item 106. In one embodiment, the item 106 can include a tag (paper-based or plastic-based) or other portable device (e.g., a cup or a vessel, a key fob, a card, or the like) having printed or otherwise embedded thereon at least the portion of the order information. In certain implementations, the tag can include an implantable microchip or a tattoo that can be removably or permanently attached to a consumer associated with the item 106. In another embodiment, the item 106 can include one of a key fob with a magnetic stripe, a card with a magnetic stripe, or a wearable device (such as a bracelet) having a magnetic stripe, where the POS 102 can program or otherwise encode the magnetic stripe with at least the portion of the order information. In yet another embodiment, the item 106 can include a radiofrequency identification (RFID) device, and the POS 102 can program or otherwise encode the RFID device with at least the portion of the order information. The RFID device can be a standalone device and can be configured to be attached to a wearable device (e.g., bracelet) or a portable device (such as a cup or other vessel). In such an embodiment, the item 106 also can have encoded thereon information indicative or otherwise representative of the item 106, such as manufacturer information indicative of a manufacturer of the item 106. In still another embodiment, the item 106 can be embodied in a user device (such as a mobile phone, a tablet computer, or the like) associated that renders or otherwise conveys at least the portion of the order information in an encoded format (e.g., a barcode format). The user device can render such information on a surface (e.g. a display surface)

of the user device. In such an embodiment, the POS 120 can provide at least the portion of the order information to the user device (e.g., user device 110) in a format configured to be rendered in the encoded format in response to processing or operation on such information by the user device. In general, the item 106 can be embodied in or can include most any device (computing or otherwise, and/or wearable or otherwise) suitable or otherwise configured to be encoded with at least a portion of the order information. As an illustration, in one embodiment, e.g., example embodiment 200, the POS 102 can include a security unit 208 that can securely encode information that can be embedded or otherwise conveyed to the machine-readable item 106 or any medium (e.g., paper, plastic, a fibrous material suitable for embedding content). In addition, in one of such embodiments, the POS 102 can include one or more composition unit(s) 210 that can generate code or other indicia to be securely encoded prior to embedding such code or indicia on a machine-readable item. Moreover, an issuance unit 218 may be integrated into or functionally coupled to the POS 102 in order to issue (e.g., print, etch, or otherwise treat) a machine-readable item, such a medium suitable for being printed, etched, or otherwise treated in order to embed information on the medium. In other embodiments of a POS, such as embodiment 250, a printer 270 can embody or can constitute the issuance unit 218. In addition, in the example embodiment 250, the functionality of at least one of the information collection unit(s) 204, at least one of the composition unit(s) 210, and/or the security unit 208 in accordance with certain aspects of this disclosure can be achieved via execution of computer-accessible instructions retained in one or more memory devices 290 (referred to as memory 290) by one or more processors 280. The computer-accessible instructions can be embodied in or can include a group of tag composition components 294.

In another aspect of self-serve dispense, the dispenser of the product dispenser(s) 130 that provides a product can access (e.g., scan and/or probe) the item 106 and, in response, can acquire information encoded on the item 106. Based at least in part on at least a portion of such information, the dispenser can determine if a product order associated with the item 106 is valid. As illustrated, the dispenser can include an acquisition unit 132 that can access the information encoded on the item 106, and a control unit 134 that can ascertain the validity or invalidity of the product order. In some embodiments, the control unit 134 can communicate (e.g., transmit information, receive information, or exchange information) via at least one of the network(s) 120 to one or more devices, locally or remotely located, such as the POS 102 and/or at least one of the backend platform(s) 150 in order to validate the product order. The structure and functionality of the acquisition unit 132 can be specific to the item 106 and/or the manner in which the information is encoded thereon. In an example embodiment in which the item 106 is embodied in or includes a portable computing device or a portable non-computing device, and at least a portion of the information is encoded on the item 106 according to a barcode (e.g., a linear barcode and/or a matrix barcode), the acquisition unit 132 can be embodied in or can include a barcode reader device that can scan the barcode. In another example embodiment in which the item 106 is embodied in or can include an RFID device, the acquisition unit 132 can be embodied in or can include an RFID reader device that can probe the RFID device and in response, can receive the information encoded thereon. In such example embodiments, the acquisition unit 132 can transmit the scanned or otherwise received information to at least the control unit 134, which can decode or otherwise interpret such information. In addition, the control unit 134 can analyze the decoded or otherwise interpreted information (e.g., manufacturer information indicative of type of the item 106), and determine if such information matches or is otherwise congruent with a permitted type of machine-accessible item 106.

In addition, as described herein, the information encoded in item 106 can include order information comprising a group of order information structures that can permit regulation of dispense of a product associated with the order information. The acquisition unit 132 also can access at least a portion of the order information. For a product order that is determined to be valid, the acquisition unit 132 can transmit at least a portion of the accessed order information to at least the control unit 134. In response, the control unit 134 can configure or otherwise initialize a dispenser of the product dispenser(s) 130 for dispense according to at least a portion of the order information. In one aspect of such configuration, the control unit 134 can generate an order record comprising information indicative or otherwise representative of an identification object (e.g., a number or a label) indicative or otherwise representative of the item; one or more fulfillment information structures; one or more of the group of order information structures, a time stamp, an expiration time (e.g., expiration date and time of day). A fulfillment information structure is indicative or otherwise representative of a dispense parameter associated with a dispensed product, and quantifies or otherwise specifies the product that has been dispensed. For instance, the fulfillment information structure can be indicative of a type of beverage that has been poured, and the amount (e.g., volume) of beverage that has been poured. The fulfillment information structure also can be indicative or otherwise representative of the associated order information. In addition, the control unit 134 can retain the order record in a memory 138 integrated into the dispenser.

In another aspect of configuration or initialization of the dispenser, the control unit 134 can transmit a directive to an interface device of the one or more interface devices 136 (which may be referred to as interface(s) 136) to render content of at least one of the group of order information structures. As illustrated, the interface(s) 136 can be integrated into the dispenser that is being configured or otherwise initialized. For example, in response the directive, such an interface can render the amount of beverage that is available or otherwise permitted to be dispensed from the dispenser. For another example, in response to the directive, the interface can render information indicative of an amount of calories that are permitted to be consumed. For yet another example, in response to the directive, the interface can render a customized greeting for a consumer associated with the product order including the group of information structures.

In yet another aspect of configuration or initialization of the dispenser, certain dispense functionality can be enabled based at least in part on at least a portion of the order information. In addition, the consumer-dispenser interaction can be customized based at least in part on at least a portion of the order information. In one aspect, content rendered at the dispenser can be customized according to an order information structure indicative or otherwise representative of a consumer associated with the product order. As an illustration, in a scenario in which an order information structure includes a parameter indicative of the age of a consumer associated with a product order, the control unit 134 can instruct at least one of the interface(s) 136 to render age-appropriate graphical user interfaces (e.g., background content suitable to the age the consumer) and/or sounds (e.g., background music, utterances, or the like, suitable to the age of the consumer). In addition, product availability (e.g., dispense permissibility of a product) can be customized according to the age of the consumer. In embodiments in which products are or include beverages, drinks including caffeine can be offered when the age of the consumer exceeds a threshold age (e.g., 12 years of age), where the amount of caffeine can be adjusted based at least on the age of consumers that satisfy the age requirement. Drinks including caffeine can include infused drinks (such as coffee, tea, chai, mate, or the like), energy drinks (carbonated or otherwise), and/or sodas. Similarly, alcoholic drinks can be offered when the age of the consumer exceeds another threshold age (e.g., 21 years of age). In addition, restriction on quantity of a sugar-sweetened beverage can be restricted at the dispenser (e.g., a single sugar-sweetened beverage may be permissible). Extra-small portions also can be configured to be available when the age of the consumer does not exceed certain threshold (e.g., 12 years of age). Age-appropriate product add-ins, such as nutritional supplements, also can be configured to be available.

The dispenser of the one or more product dispenser(s) 130 that is configured or otherwise initialized for dispense of a product according to a product order can receive selection information indicative of a product selection. The selection information can include a group of selection information structures that specify or otherwise characterize a selected product. Such selection information structure(s) can be embodied in or can include one or more selection parameters. For instance, in certain embodiments, the group of selection information structures can include one or more of a selection parameter indicative of type of product (e.g., a carbonated beverage, an infused beverage, a juice, a novelty beverage, or the like) or a selection parameter indicative of an amount of product. In certain implementations, an interface device of the interface(s) 136 integrated into the dispenser can receive at least a portion of the selection information. For instance, the interface device can render one or more product options (e.g., product type, product serving size, product add-ins, or the like) that can be selected, and in response, the interface device can receive a selection of at least one of the one or more product options via, for example, a consumer's gesture or speech or utterance. In one example, the consumer's gesture can include a touch, a swipe, or other movement and/or interaction with a surface of the interface device, and can be effected by a consumer's body part or device. In another example, the consumer's speech or utterance can include a word, phrase, sentence, and/or other command with the interface device, and can be effected by the consumer's voice, voice synthesization, or a recording of a voice. Additionally or alternatively, the interface device can render a product option that is unavailable for selection (e.g., such an option may be presented as a grayed out icon) based at least on the product order. Presentation of product option(s) unavailable for selection can permit educating a consumer about additional option(s) that may be available with different product orders. The selection of the at least one or more product options can constitute, at least in part, the selection information.

The dispenser of the one or more product dispenser(s) 130 that receives selection information indicative of a product selection in response to fulfillment of a product order can determine if the product selection is valid. As described herein, the product order can be characterized or otherwise specified by a group of order information structures that establishes a range of permissible or otherwise allowable products that can be dispensed in response to fulfillment of the product order. Accordingly, the validity of the selection information can be dictated, at least in part, by whether the product selection is directed to a product within the range of permissible or otherwise allowable products. In one implementation, the interface of the interface(s) 136 that receives the selection information can transmit at least a portion of the selection information to the control unit 134 that is integrated into or otherwise functionally coupled to the dispenser. The control unit 134 can determine if the product selection is valid based at least in part on a group of order information structures included in order information associated with the product order and a group of selection information structures included in the selection information. To at least such an end, in one aspect, the control unit 134 can compare at least one of the group of order information structures with at least one of the group of selection information structures. In another aspect, the control unit 134 can configure the product selection as valid in response to the comparison yielding an outcome within a predetermined range, and can configure the product selection as invalid in response to the comparison yielding an outcome outside the predetermined range. For example, when the product order includes a non-premium beverage (e.g., a carbonated soft drink), selection of a non-premium beverage (e.g., a carbonated soft drink) at the dispenser is a valid product selection, and selection of a premium beverage (e.g., a juice) is an invalid product selection. Similarly, selection of a product having a price point that is less than the pre-paid price for the product order is a valid product selection. For instance, when the order includes a large drink, selection of a small, medium, or large drink is a valid product selection, whereas selection of an extra-large drink is an invalid selection.

In response to an invalid product selection, the dispenser of the one or more product dispenser(s) 130 that receives selection information indicative or otherwise representative of a product selection can perform exception handling. To at least such an end, in certain implementations, the control unit 134 that is integrated into the dispenser can transmit instruction(s) to an interface of the interface(s) 136 integrated into the dispenser to render information indicative of a directive to the consumer to return to a POS (e.g., POS 102) for additional payment and/or make an alternative product selection. The interface can render at least a portion of such information visually (e.g., graphically and/or textually), aurally, and/or mechanically (e.g., in a scenario in which the interface includes a haptic interface device). In other implementations, the control unit 134 can supply instruction(s) to an interface of the interface(s) 136 integrated into the dispenser to prompt a consumer associated with the selection information associated with the invalid product selection to supply payment information to continue the dispense. At least a portion of the payment information can be received at such an interface. In yet other implementations, in a scenario in which payment information associated with such a consumer is available to the dispenser, the control unit 134 can supply instruction(s) to an interface of the interface(s) 136 to inform the consumer that an additional charge may be added to the consumer's account should the consumer proceed with the dispense. At least a portion of the payment information can be available to the product dispenser via a network node (e.g., one of server(s) 152) that retains such information and is accessible via a network (e.g., one of network(s) 120) to a service operator associated with the product dispenser. In some embodiments, the control unit 134 can validate the product order prior to the interface rendering any product selection(s), such that only valid selections are rendered at the interface. Non-electable product selection(s) (such as grayed out product option(s) and/or option(s) rendered via indicia indicative of non-electability) also can be rendered at the interface. In at least one of such embodiments, no validation may be necessary after a product selection because the electable product selections have been already validated for the product order.

In the alternative, in response to validation of a product selection, the dispenser of the one or more product dispenser(s) 130 that receives selection information indicative of the product selection can dispense a selected product based on the selection information. As illustrated, such a dispenser can include a product composition platform 140 that permits formation or otherwise generation of the selected product. In one example, the product composition platform 140 can include one or more ingredient sources (e.g., at least one macro-ingredient source (such as a concentrate); at least one micro-ingredient source (such as an additive or nutrition supplement); a combination thereof, or the like). The product composition platform 140 also can include one or more diluent sources (e.g., still water (purified, non-purified, or distilled), carbonated water, or the like). In addition, the product composition platform 140 can include a mixer device (or mixer) that permits composition of numerous product types (e.g., beverage types, paint types, shampoo and/or conditioner types, and the like). In certain embodiments, an ingredient matrix can embody or can constitute the product composition platform 140, where the ingredient matrix can contain the one or more ingredient sources. The ingredient matrix can be embodied in or can include a group of receptacles or mountings configured to receive or mount to a respective product ingredient package or other product ingredient supply, each of such packages (which also may be referred to as product-forming ingredient packages) or supplies can embody or can constitute an ingredient source. As an example, a product ingredient package can be manufactured as a pouch of liquid secured in a plastic ridged container to allow insertion into the ingredient matrix. In some embodiments, one or more ingredient packages mounted or otherwise coupled to the ingredient matrix can be direct supplies rather than packages. For example, a product package can be a sweetener provided from a sweetener source such as a non-nutritive sweetener (NNS) or high fructose corn syrup (HFCS). Similarly, a diluent source may be mounted or otherwise assembled into the ingredient matrix. For instance, such a diluent source can a substantially continuous or continuous supply of water (tap water, purified water, or distilled water).

In addition, the product composition platform 140 can include multiple metering devices, where an ingredient source of the product composition platform 140 can be functionally coupled to at least one of the multiple metering devices. A combination of two or more of the metering devices can permit dispense or can dispense a predetermined type and ratio of ingredient(s) and diluent. For instance, such metering devices can dispense a specific ratio of concentrate, a sweetener, nutraceutical, and carbonated water. In certain embodiments, at least some of the metering devices (e.g., pumps) can be positioned or otherwise disposed between an ingredient source (e.g., a macro-ingredient source or a micro-ingredient source), a diluent source, and a dispensing valve.

The product composition platform 140 is functionally coupled (e.g., mechanically coupled, fluidically coupled, electronically coupled, a combination thereof, or the like) to a product dispense platform 142 that can dispense the selected product. In one example, the product dispense platform 142 can include one or more dispensing valves and/or one or more dispense nozzles. Such valves or nozzles can permit dispense of a product from a product dispenser. A dispensing valve can include a flow director in communication with an ingredient source (e.g., a macro-ingredient source) and the diluent source. In addition or in the alternative, the dispensing valve can include a tertiary flow assembly in communication with another ingredient source (e.g., a micro-ingredient source).

Based at least on this disclosure, it can be appreciated that in certain embodiments, a beverage dispensed via a dispenser of the product dispenser(s) 130 is a post-mix beverage, where the beverage is composed via mixing of ingredient(s) and diluent(s) prior to dispense of the beverage. Mixing of the ingredient(s) and diluent(s) can be implemented in accordance with a predetermined formulation (e.g., a standard formulation associated with a core brand or a customized formulation provided by a consumer or a third-party). Constituents of the post-mix beverage may not be consumed individually. Aspects of this disclosure also can be utilized or otherwise leveraged in self-serve dispense of beverages or products other than post-mix beverages. Post-mix beverages may be consumed after mixing and may include ingredients that cannot be consumed independently, such as concentrate. In some embodiments, post-mix beverages may be formed from one or more ingredients mixed at a nozzle of a dispenser, or upon exiting the dispenser.

After or upon dispense of a selected product by a dispenser of the product dispenser(s) 130, a computing device integrated into or otherwise functionally coupled to the dispenser can determine if a product order associated with the selected product is fulfilled in response to dispensing such a product. In certain scenarios, the computing device can be embodied or can include the control unit 134, and to determine if the beverage order is fulfilled, the control unit 134 can determine if a predetermined quantity or amount of the product has been substantially dispensed. As described herein, the predetermined quantity or amount of the product can be specified or otherwise characterized in an order information structure included in the product order. In addition or in the alternative, the computing device can update the product order in response to dispense of the selected product. To at least such an end, in one aspect, the computing device can update a record associated with a product order and that is indicative of an amount of the product that is dispensed. In scenarios in which the product order is associated with an incentivation program, the computing device can update information associated with such a program in response to dispense of the selected product and/or other post-dispense activity. For example, the incentivation program can include a loyalty program and the computing device can update a record of loyalty points in response to dispense of the selected product. In addition, the computing device can award loyalty points and update the record thereof in response to a consumer associated with the dispensed selected product participating in a service survey at the dispenser. In one implementation, the service survey can be effected via an interface device integrated into or functionally coupled to the dispenser. In such implementation, the interface device can render the service survey via a graphical user interface.

Figure 3A:
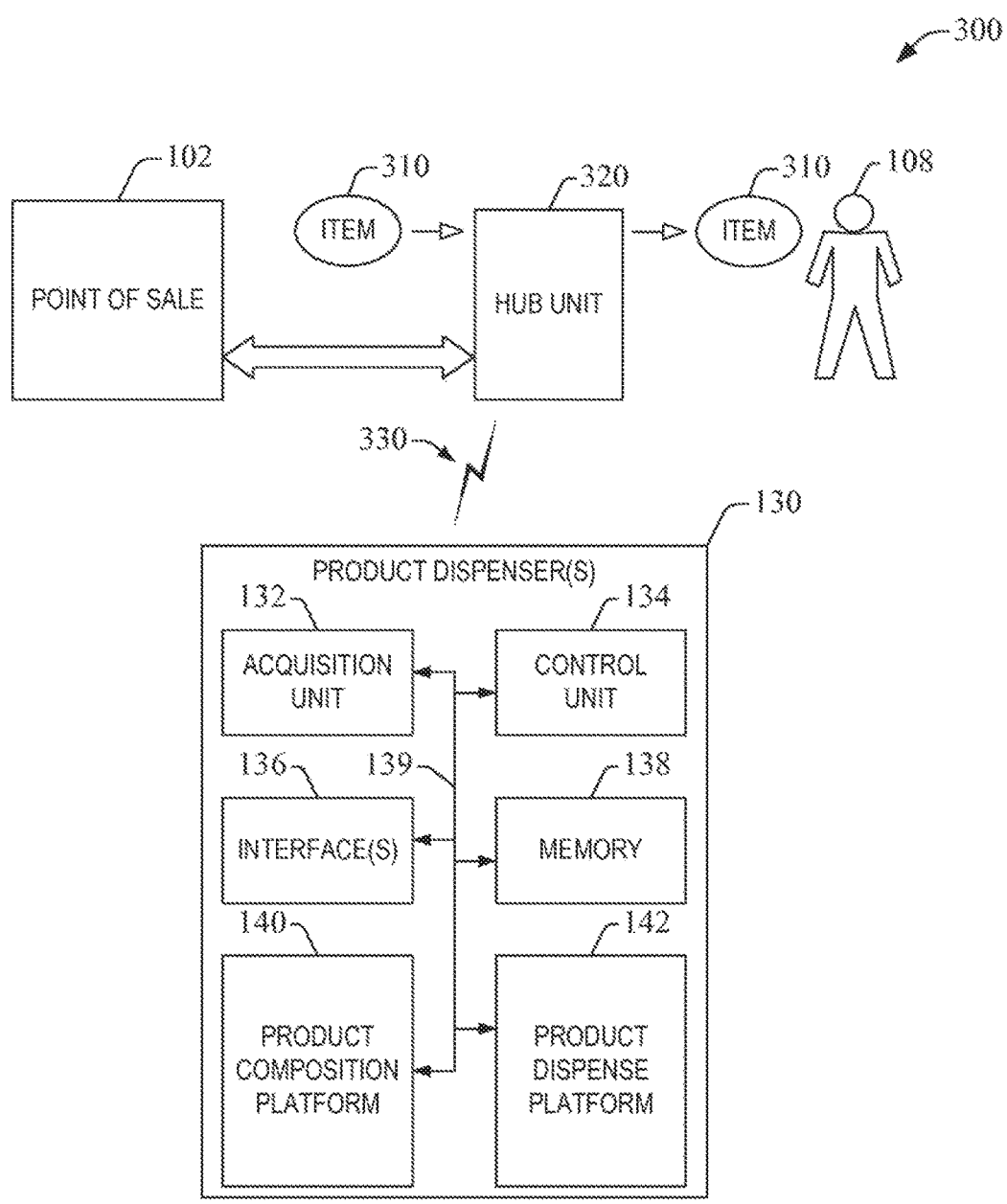
FIGS. 3A-3B illustrate example self-serve environments for dispense of a product in accordance with one or more embodiments of the disclosure.
Figure 3B:
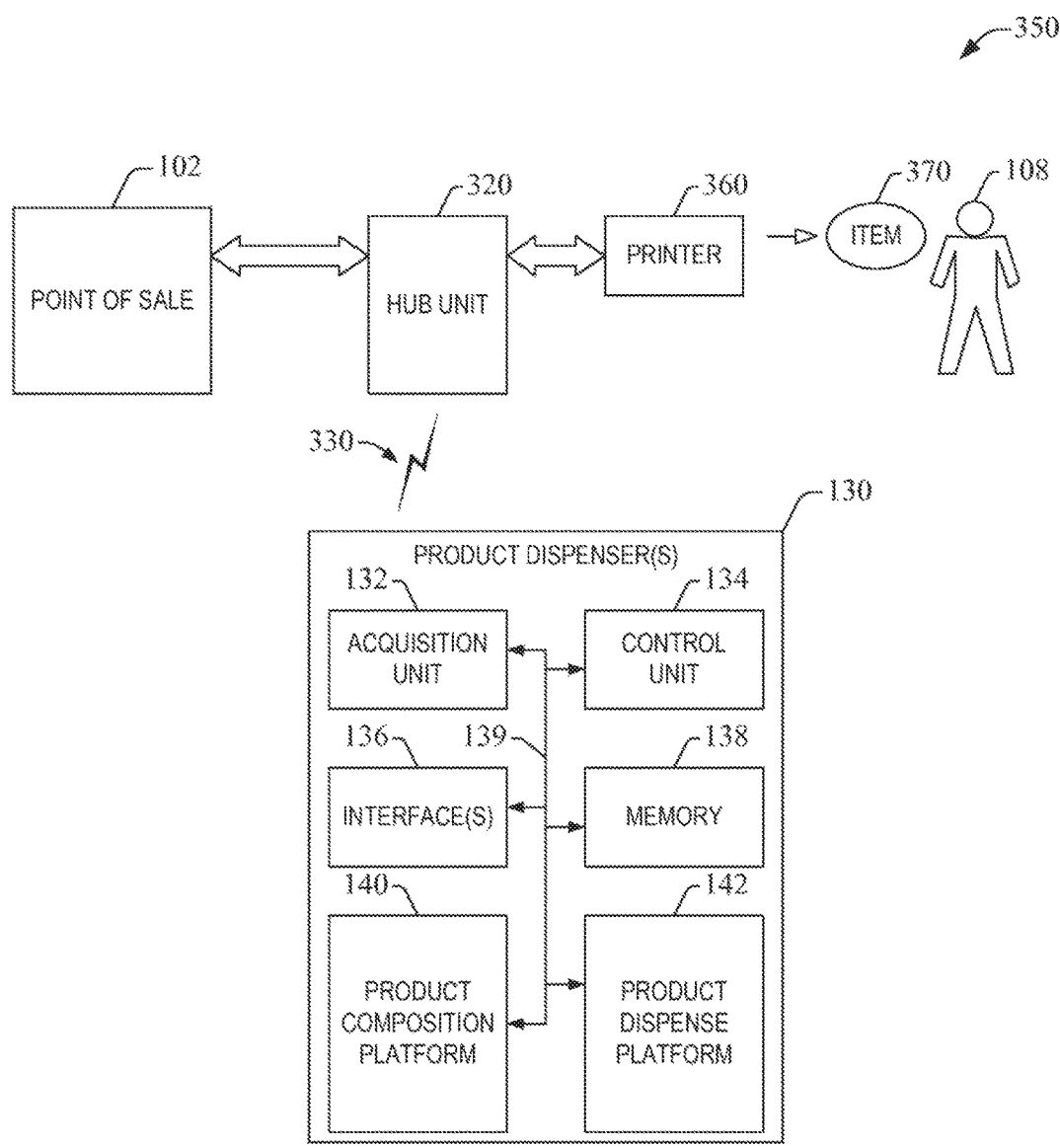
Figure 4:
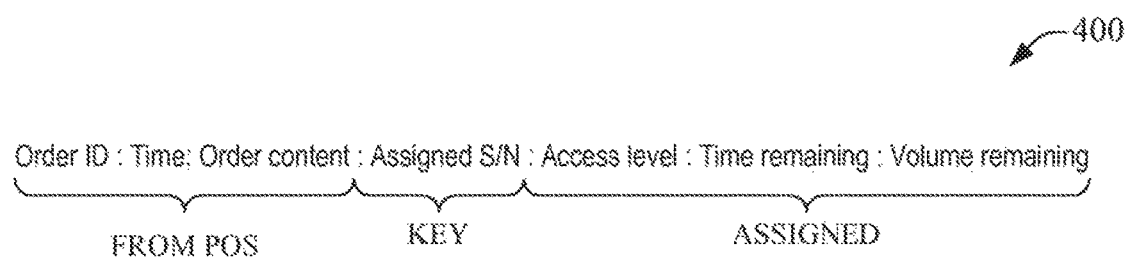
FIG. 4 illustrates an example of an order record for self-serve control in accordance with one or more embodiments described herein.

FIGS. 3A-3B illustrate other examples of self-serve environments for dispense of a product in accordance with one or more embodiments of the disclosure. In the example self-serve environment 300, a hub unit 320 can be functionally coupled (e.g., communicatively coupled) to the POS 102 via link(s) and/or traffic and signaling pipe(s) (represented with an arrow in FIGS. 3A-3B), and can access or otherwise identify a product order (e.g., a beverage order) associated with a purchase of a product or other transaction at the POS 102. The hub unit 320 can record or otherwise retain information indicative or otherwise representative of the product order; such as order identifier (e.g., order number); date of purchase; time of purchase; order content (e.g., type and/or size of beverage purchased); a combination thereof; or the like. In addition, in one embodiment, the hub unit 320 can configure a group of parameters that can permit control of access to the purchased product. In one implementation, the hub unit 320 can configure one or more access parameters associated with the product order, such as access level to a product dispenser; permitted period for consumption or acquisition of the product or a portion thereof; quantity or amount of the product that is allowed to be consumed or otherwise acquired; a combination thereof; or the like. In a scenario in which the product is a beverage, the quantity or amount of the product that is allowed to be consumed can represent refill privileges (e.g., one refill or multiple refills) associated with the product order. The hub unit 320 can record or otherwise retain information indicative or otherwise representative of one or more access parameters. As an illustration, FIG. 4 presents an example order record containing information indicative of otherwise representative of the product order (e.g., "Order ID," "Time," and "Order content"), and information indicative or otherwise representative of the access parameters (e.g., "Access level," "Time remaining," and "Volume remaining.") The order record can constitute a database, a database table, or other information structure retained in a memory device of the hub unit 320.

In addition, a machine-readable item 310 (such as a cup or a vessel, a printed barcode or other scannable code, a key fob, a card or token, or the like) that has a code or other indicia embedded thereon can be supplied to a hub unit 320 in response to a purchase of a product at the point of sale 102. The hub unit 320 can access or otherwise receive the code or indicia, and can associate the code or indicia to the product order associated with the purchased product. To at least such an end, in one aspect, the hub unit 320 can include an acquisition unit (such as a camera, a barcode reader, or the like) that permit acquiring (e.g., machine-reading) the code or the indicia, and can decode or otherwise interpret the code or indicia. The decoded or otherwise interpreted information can be retained in a memory device integrated into or functionally coupled with the hub unit 320. In other embodiments, such as self-serve environment 350 shown in FIG. 3B, the hub unit 320 can generate the code or indicia, and can associate it to the product order associated with the purchased product. To at least such an end, in one aspect, the hub unit 320 can be functionally coupled to a printer 360 which can print the code or indicia on a machine-readable item 370. In one example implementation, the printed code or indicia can be embodied or can contain a two-dimensional (2D) bar code. Regardless of the source of the code or indicia source, e.g., whether the code or indicia is received at the hub unit 320 or is generated by the hub unit 320, the code or indicia can be embodied in or can contain a numeric string, an alphabetic string, an alphanumeric string, an image, a combination of the foregoing, or the like. In certain implementations, the code or indicia can be encoded according to a barcode scheme including one or more of a linear barcode or a matrix barcode, such as a quick response (QR) code or a mini QR code. The code or indicia can represent or otherwise convey a serial number. As illustrated in FIG. 4, the hub unit 320 can retain such a code or indicia of an order record.

The machine-readable item 310 can be provided to a consumer 108, who can utilize the machine-readable item 310 (e.g., a cup or vessel) to access or otherwise acquire the purchased product at a product dispenser of the product dispenser(s) 130. To at least such an end, in one aspect, the machine-readable item 310 can be placed in proximity or in contact with the product dispenser, which can scan or otherwise access, via the acquisition unit 132, for example, the code or indicia that is embedded on the machine-readable item 310. More specifically, yet not exclusively, in one embodiment in which the machine-readable item 310 is embodied in a cup, the code or indicia embedded on such a cup can be scanned or machine-read by a reader device (which can embody or can constitute the acquisition unit 132). In addition, the product dispenser can communicate at least a portion of the information accessed from the machine-readable item 310 to the hub unit 320. Such information can be communicated to the hub unit 320 for validation. As described herein, such information can include a serial number associated with a purchase order associated with the purchase product, which can be communicated to the hub unit 320 in order to validate the purchase order. In the illustrated embodiment, the product dispenser of the product dispenser(s) 130 can be functionally coupled with the hub unit 320 via wireless link(s) 330, which can include an upstream link (UL) and/or a downstream link (DL) configured in accordance with a specific radio technology protocol. For instance, in certain embodiments, the hub unit 320 and one or more of the product dispenser(s) 130 can communicate according to Wi-Fi protocols (such as those of the Institute of Electrical and Electronics Engineers (IEEE) 802.11 family of standards). Other radio technology protocols contemplated in this disclosure can include $3^{rd}$ Generation Partnership Project (3GPP) Universal Mobile Telecommunication System (UMTS); 3GPP Long Term Evolution (LTE); 4G/5G communication protocols, LTE Advanced (LTE-A); Worldwide Interoperability for Microwave Access (WiMAX); radio technologies and related protocols for ad hoc networks, such as Bluetooth or ZigBee; other protocols for packetized wireless communication and/or protocols for communications within an industrial environment; or the like).

In order to validate information received from a product dispenser regarding a purchase order, the hub unit 320 can identify the purchase order in memory storage within the hub unit 320 or otherwise accessible by the hub unit 320, and can determine if the purchase order is valid or invalid. To at least such an end, the hub unit 320 can compare an access parameter associated with the purchase order with the current state or magnitude of the access parameter, and in response to the current state of the access parameter being compliant with the access parameter, the hub unit 320 can ascertain that the purchase order is valid. In the alternative, for a non-compliant access parameter, the hub unit 320 can ascertain that the purchase order is invalid. More specifically, yet not exclusively, as an illustration, if an access parameter indicative of allowed beverage refill establishes that three refills are permissible, and the current state of the access parameter conveys that two refills have been served for the purchase order, then the purchase order is valid.

The hub unit 320 can communicate a validation response to a product dispenser of the product dispenser(s) 130 that previously communicated a validation request, where the validation response is indicative or representative of validity or invalidity of a purchase order. For a purchase order that is deemed valid, such a product dispenser can receive a validation response that conveys the validity of the purchase, and in response, can configure a dispense component and/or dispense mechanism for active dispense of a product. In addition, the product dispenser can dispense a product in accordance with the purchase order, e.g., the product dispenser can dispense certain amount of a certain type of post-mix beverage, or certain amount of a juice or other beverage.

After dispense of a product, a product dispenser can communicate, to the hub unit 320, pour information indicative of the product that has been dispensed. The pour information can be communicated wirelessly and can include information indicative of a quantity or amount of dispensed product, a time at which the product has been dispensed, a combination thereof, or the like. The hub unit 320 can receive the pour information and can utilize it to update a record of the purchase order, which can be maintained within the hub unit 320 or in a memory device accessible to the hub unit 320.

Figure 5:
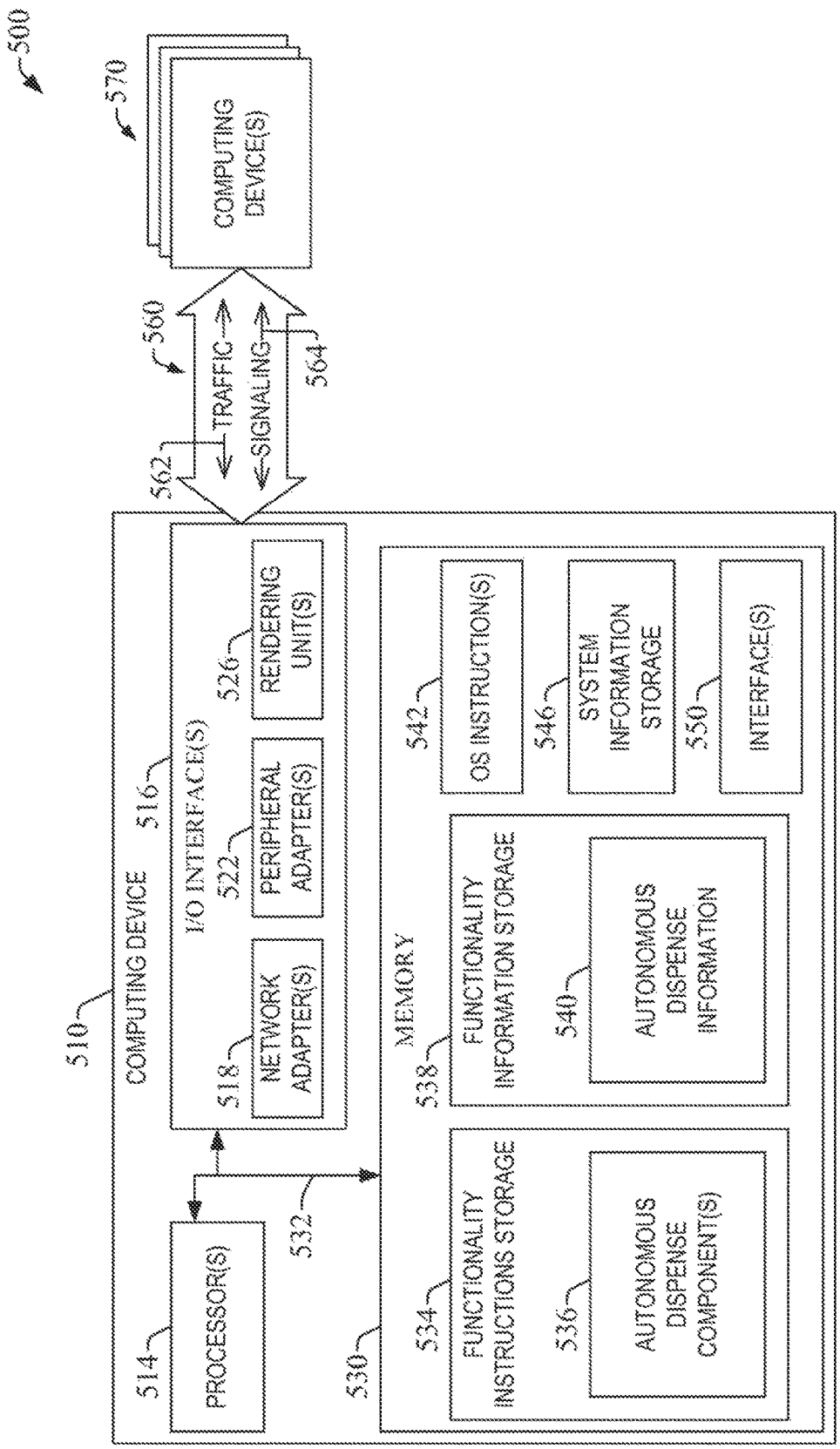
FIG. 5 illustrates an example computational environment for autonomous product dispense and/or management thereof in accordance with one or more embodiments of the disclosure.

FIG. 5 illustrates a block diagram of an example of a computational environment 500 for autonomous product dispense (e.g., self-serve product dispense) and/or management thereof in accordance with one or more aspects of the disclosure. The example computational environment 500 is merely illustrative and is not intended to suggest or otherwise convey any limitation as to the scope of use or functionality of the operating environment's architecture. In addition, the illustrative computational environment 500 depicted in FIG. 5 should not be interpreted as having any dependency or requirement relating to any one or combination of components illustrated as part of the computational environment 500. The computational environment 500 comprises a computing device 510 and one or more computing devices 570, which in various embodiments, can correspond to one or more units and/or devices described herein.

The computational environment 500 represents an example implementation of various aspects of the disclosure in which the processing or execution of operations described in connection with autonomous product dispense (e.g., self-serve product dispense) and/or management thereof as disclosed herein can be performed in response to execution of one or more software components at the computing device 510. It should be appreciated that the one or more software components can render the computing device 510, or any other computing device that contains such components, a particular machine for generation of autonomous product dispense (e.g., self-serve product dispense) and/or management thereof as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 6-10. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 510 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 510 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects of the disclosure in connection with autonomous product dispense (e.g., self-serve product dispense) and/or management thereof as described herein can comprise personal computers; server computers; laptop devices; handheld computing devices, such as mobile tablets; wearable computing devices; gesture-based computers; networked or otherwise distributed devices and interfaces; and multiprocessor systems. Additional examples can include programmable consumer electronics, network PCs, minicomputers, mainframe computers, blade computers, programmable logic controllers (PLCs), distributed computing environments that comprise any of the above systems or devices, or the like.

As illustrated, the computing device 510 can comprise one or more processors 514, one or more input/output (I/O) interfaces 516, one or more memory devices 530 (herein referred to generically as memory 530), and a bus architecture 532 (also termed bus 532) that functionally couples various functional elements of the computing device 510. In certain embodiments, the computing device 510 can include, optionally, a radio unit (not depicted in FIG. 5). The radio unit can include one or more antennas and a communication processing unit (which also may be referred to as a processing unit) that can permit wireless communication between the computing device 510 and another device, such as one of the computing device(s) 570. At least one of the computing device(s) 570 can have similar or identical architecture to the computing device 510. For example, in an embodiment in which the computing device 510 embodies or constitutes the hub unit 320 and a computing device of the computing device(s) 570 embodies or constitutes at least one unit of a product dispenser of the product dispenser(s) 130, a radio unit of the hub unit and a radio unit associated with the at least one unit of such a product dispenser can permit wireless communication between the hub unit 320 and the product dispenser.

The communication processing unit of the radio unit described herein (not shown in FIG. 5) can process (e.g., compute, analyze, and the like) at least wireless signals in accordance with one or more radio technology protocols and/or modalities (such as multiple-input-multiple-output (MIMO), single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include $3^{rd}$ Generation Partnership Project (3GPP) Universal Mobile Telecommunication System (UMTS); 3GPP Long Term Evolution (LTE); 4G/5G communication protocols; LTE Advanced (LTE-A); Wi-Fi protocols, such as those of the Institute of Electrical and Electronics Engineers (IEEE) 802.11 family of standards;

Worldwide Interoperability for Microwave Access (WiMAX); radio technologies and related protocols for ad hoc networks, such as Bluetooth or ZigBee; other protocols for packetized wireless communication and/or protocols for communications within an industrial environment; or the like). The communication processing unit also can process non-wireless signals (analogic, digital, optical, a combination thereof, or the like).

The bus 532 can include at least one of a system bus, a memory bus, an address bus, or a message bus, and can permit exchange of information (data, metadata, and/or signaling) between the processor(s) 514, the I/O interface(s) 516, and/or the memory 530, or respective functional elements therein. In certain scenarios, the bus 532 in conjunction with one or more internal programming interfaces 550 (also referred to as interface(s) 550) can permit such exchange of information. In scenarios in which processor(s) 514 include multiple processors, the computing device 510 can utilize parallel computing.

The I/O interface(s) 516 can permit communication of information between the computing device and an external device, such as another computing device, e.g., a network element or an end-user device. Such communication can include direct communication or indirect communication, such as exchange of information between the computing device 510 and the external device via a network or elements thereof. As illustrated, the I/O interface(s) 516 can comprise one or more of network adapter(s) 518, peripheral adapter(s) 522, and rendering unit(s) 526. Such adapter(s) can permit or facilitate connectivity between the external device and one or more of the processor(s) 514 or the memory 530. For example, the peripheral adapter(s) 522 can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

In one aspect, at least one of the network adapter(s) 518 can functionally couple the computing device 510 to one or more computing devices 570 via one or more traffic and signaling pipes 560 that can permit or otherwise facilitate exchange of traffic 562 (e.g., data and/or metadata) and signaling 564 between the computing device 510 and the one or more computing devices 570. It should be appreciated that, in one example, at least a portion of the one or more traffic and signaling pipes 560 can embody or can constitute at least a portion of the network(s) 120. In another example, at least a portion of the one or more traffic and signaling pipes 560 can be functionally coupled to network(s) (such as network(s) 120 of FIG. 1), which can be functionally coupled via at least another portion of the one or more traffic and signaling pipes 560 to at least one of the computing device(s) 570. Such network coupling provided at least in part by the at least one of the network adapter(s) 518 can be implemented in a wired environment, a wireless environment, or a combination of both. The information that is communicated by the at least one of the network adapter(s) 518 can result from implementation of one or more operations in a method of the disclosure. Such output can include any form of visual representation, including, but not limited to, textual, graphical, animation, audio, tactile, or the like. In certain scenarios, each of the computing device(s) 570 can have substantially the same architecture as the computing device 510. In addition, or in the alternative, the rendering unit(s) 526 can include functional elements (e.g., lights, such as light-emitting diodes; a display, such as liquid crystal display (LCD), a plasma monitor, a light emitting diode (LED) monitor, an electrochromic monitor; combinations thereof or the like) that can permit control of the operation of the computing device 510, or can permit conveying or revealing the operational conditions of the computing device 510.

In one aspect, the bus 532 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 532, and all buses described herein can be implemented over a wired or wireless network connection and each of the subsystems, including the processor(s) 514, the memory 530 and memory elements therein, and the I/O interface(s) 516 can be contained within one or more remote computing devices 570 at physically separate locations, connected through buses of this form, thereby effectively implementing a fully distributed system.

The computing device 510 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 510, and can comprise, for example, both volatile and non-volatile media, and removable and/or non-removable media. In one aspect, the memory 530 can comprise computer-readable media in the form of volatile memory, such as random access memory (RAM), and/or non-volatile memory, such as read-only memory (ROM).

The memory 530 can comprise functionality instructions storage 534 and functionality information storage 538. The functionality instructions storage 534 can comprise computer-accessible instructions that, in response to execution by at least one of the processor(s) 514, can implement one or more of the functionalities of the disclosure. The computer-accessible instructions can embody or can comprise one or more software components illustrated as autonomous dispense component(s) 536. In one scenario, execution of at least one component of the autonomous dispense component(s) 536 can implement one or more of the methods described herein. For instance, such execution can cause a processor that executes the at least one component to carry out a disclosed example method. It should be appreciated that, in one aspect, a processor of the processor(s) 514 that executes at least one of the autonomous dispense component(s) 536 can retrieve information from or retain information in a memory element 540 in the functionality information storage 538 in order to operate in accordance with the functionality programmed or otherwise configured by the autonomous dispense component(s) 536. Such information can include at least one of code instructions, information structures, or the like. Such instructions and information structures can embody or can constitute machine-learning techniques (e.g., pattern recognition algorithms; inference algorithms; triangulation or location estimation algorithms; temporal algorithms (e.g., algorithms in which an offer is served or otherwise communicated to consumers at a relevant day and/or time); and the like) that can be utilized to implement at least certain functionality described herein. It should be appreciated that, in one example, the relevancy of time to communicate an offer can be determined or otherwise modeled by an inference technique or algorithm. At least one of the one or more interfaces 550 (e.g., application programming interface(s), display devices and associated graphical user interface(s), and the like) can permit or facilitate communication of information between two or more components within the functionality instructions storage 534. The information that is communicated by the at least one interface can result from implementation of one or more operations in a method of the disclosure. In certain embodiments, one or more of the functionality instructions storage 534 and the functionality information storage 538 can be embodied in or can comprise removable/non-removable, and/or volatile/non-volatile computer storage media.

At least a portion of at least one of the autonomous dispense component(s) 536 or autonomous dispense information 540 can program or otherwise configure one or more of the processors 514 to operate at least in accordance with the functionality described herein. In one embodiment, the autonomous dispense component(s) 536 contained in the functionality instruction(s) storage 534 can include one or more of at least a portion of at least one of the interface(s) 136. In addition or in the alternative, at least one of the processor(s) 514 and at least one of the autonomous dispense component(s) 536 can embody or can constitute at least a portion of the control unit 134. Moreover or as another alternative, at least one of the processor(s) 514 and at least one of the autonomous dispense component(s) 536 can embody or can constitute at least a portion of the acquisition unit 132. In such embodiment(s), hardware and/or firmware functional elements of the acquisition unit 132, the interface(s) 136, and/or the control unit can be embodied in suitable components of the computing device 510. For instance, at least one of the processors 514 and at least one of the I/O interface(s) 516 (e.g., a network adapter of the network adapter(s) 518) can embody an interface, (such as a GUI that presents selectable and non-selectable product options) of the interface(s) 136 and/or I/O interface(s) 260. One or more of the processor(s) 514 can execute at least one of the autonomous dispense component(s) 536 and can leverage at least a portion of the information in the functionality information storage 538 in order to provide autonomous product dispense (e.g., self-serve product dispense) and/or management thereof in accordance with one or more aspects described herein.

Similarly, in certain embodiments, the autonomous dispense component(s) 536 contained in the functionality instruction(s) storage 534 can include one or more of at least a portion of at least one of the I/O interface(s) 260 and/or at least a portion of at least one of the tag composition component(s) 294. In addition or in the alternative, at least one of the processor(s) 514 and at least one of the autonomous dispense component(s) 536 can embody or can constitute at least a portion of at least one of the information collection unit(s) 204. Moreover or as another alternative, at least one of the processor(s) 514 and at least one of the autonomous dispense component(s) 536 can embody or can constitute at least a portion of at least one of the composition unit(s) 210. Further or as yet another alternative, at least one of the processor(s) 514 and at least one of the autonomous dispense component(s) 536 can embody or can constitute at least a portion of the security unit 208. Furthermore or as still another alternative, at least one of the processor(s) 514 and at least one of the autonomous dispense component(s) 536 can embody or can constitute at least a portion of the issuance unit 218. In such embodiment(s), hardware and/or firmware functional elements of the information collection unit(s) 204, the composition unit(s) interface(s) 136, and/or the control unit can be embodied in suitable components of the computing device 510. For instance, at least one of the processors 514 and at least one of the I/O interface(s) 516 (e.g., a network adapter of the network adapter(s) 518) can embody at least one of the information collection unit(s) 204 (such as a scanner or a reader device). One or more of the processor(s) 514 can execute at least one of the autonomous dispense component(s) 536 and can leverage at least a portion of the information in the functionality information storage 538 in order to provide autonomous product dispense (e.g., self-serve product dispense) and/or management thereof in accordance with one or more aspects described herein.

It should be appreciated that, in certain scenarios, the functionality instruction(s) storage 534 can embody or can comprise a computer-readable non-transitory storage medium having computer-accessible instructions that, in response to execution, cause at least one processor (e.g., one or more of processor(s) 514) to perform a group of operations comprising the operations or blocks disclosed in connection with the methods of this disclosure.

In addition, the memory 530 can comprise computer-accessible instructions and information (e.g., data and/or metadata) that permit or facilitate operation and/or administration (e.g., upgrades, software installation, any other configuration, or the like) of the computing device 510. Accordingly, as illustrated, the memory 530 can comprise a memory element 542 (labeled operating system (OS) instruction(s) 542) that can contain one or more program modules that embody or include one or more operating systems, such as a Windows operating system, Mac OS, Unix, Linux, Symbian, iOS, Android, Chromium, Jolla, Firefox OS, or substantially any OS suitable for mobile computing devices, gesture-based computing devices, or tethered computing devices. In one aspect, the operational and/or architectural complexity of the computing device 510 can dictate a suitable OS. The memory 530 also comprises a system information storage 546 having data and/or metadata that permits or facilitates operation and/or administration of the computing device 510. Elements of the OS instruction(s) 542 and the system information storage 546 can be accessible or can be operated on by at least one of the processor(s) 514.

It should be recognized that while the functionality instructions storage 534 and other executable program components, such as the OS instruction(s) 542, are illustrated herein as discrete blocks, such software components can reside at various times in different memory components of the computing device 510, and can be executed by at least one of the processor(s) 514. In certain scenarios, an implementation of the autonomous dispense component(s) 536 can be retained on or transmitted across some form of computer-readable media.

The computing device 510 and/or one of the computing device(s) 570 can include a power supply (not shown), which can power up components or functional elements within such devices. The power supply can be a rechargeable power supply, e.g., a rechargeable battery, and it can include one or more transformers to achieve a power level suitable for operation of the computing device 510 and/or one of the computing device(s) 570, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 518) to connect operationally to the conventional power grid. In another aspect, the power supply can include an energy conversion component, such as a solar panel, to provide additional or alternative power resources or autonomy for the computing device 510 and/or at least one of the computing device(s) 570.

The computing device 510 can operate in a networked environment by utilizing connections to one or more remote computing devices 570. As an illustration, a remote computing device can be a personal computer, a portable computer, a server, a router, a network computer, a peer device or other common network node, and so on. As described herein, connections (physical and/or logical) between the computing device 510 and a computing device of the one or more remote computing devices 570 can be made via one or more communication platforms 560 (e.g., traffic and signaling pipes), which can comprise wireline link(s) and/or wireless link(s) and several network elements (such as routers or switches, concentrators, servers, and the like) that form a local area network (LAN) and/or a wide area network (WAN). Such networking environments are conventional and commonplace in eateries, dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 570) that are functionally coupled (e.g., communicatively linked or otherwise coupled) through a network having traffic and signaling pipes and related network elements. In a distributed computing environment, in one aspect, one or more software components (such as program modules) can be located in both the computing device 510 and at least one remote computing device of the computing device(s) 570, for example. It should be appreciated that in such distributed environments, the functionality for generation of organization intelligence and management thereof can be implemented by the system constituted at least by the computing device 510 and at least one of the computing device(s) 570. Such a system can embody or can contain at least a portion of the example operational environment 100, 300, 350 or a portion thereof In view of the aspects described herein, examples of techniques for autonomous product dispense and/or management thereof that can be implemented in accordance with at least certain aspects of the disclosure can be better appreciated with reference to the diagrams in FIGS. 6-10. For purposes of simplicity of explanation, the examples of the techniques disclosed herein are presented and described as a series of blocks (with each block representing an action or an operation in a method, for example). However, it is to be understood and appreciated that the disclosed techniques (e.g., process(es), procedure(s), method(s), and the like) are not limited by the order of blocks and associated actions or operations, as some blocks may occur in different orders and/or concurrently with other blocks from that are shown and described herein. For example, the various techniques of the disclosure can be alternatively represented as a series of interrelated states or events, such as in a state diagram. Further, not all illustrated blocks, and associated action(s) or operation(s), may be required to implement a technique in accordance with one or more aspects of the disclosure. Further yet, two or more of the techniques disclosed herein can be implemented in combination with each other in order to accomplish one or more features and/or advantages described herein.

It should be appreciated that the techniques of the disclosure can be retained on an article of manufacture, or computer-readable storage medium in order to permit or otherwise facilitate transporting and transferring such methods to a computing device (e.g., a desktop computer; a mobile computer, such as a tablet, or a smartphone; gesture-based computers; a connected device or connected surface; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer-readable or machine-readable storage medium, to implement the one or more methods. The code instructions can embody or can constitute the techniques, and thus can provide a computer-executable or machine-executable framework to implement the techniques described herein.

Figure 6:
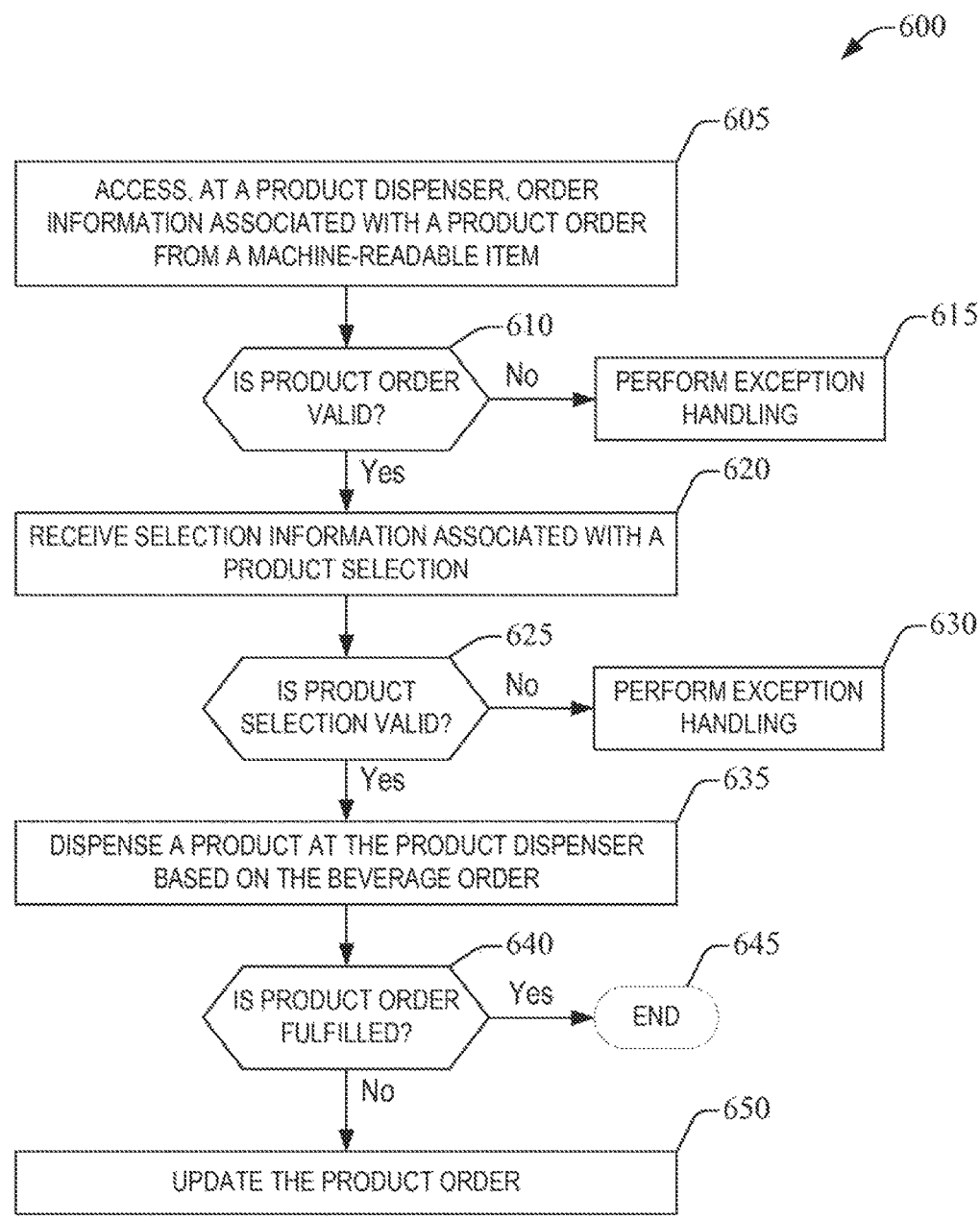
FIGS. 6-11 illustrate example methods in accordance with one or more embodiments of the disclosure.

FIG. 6 illustrates a flowchart of an example method 600 for dispensing a beverage in accordance with one or more embodiments of the disclosure. The subject example method can be implemented by a product dispenser and/or one or more computing devices functionally coupled thereto. At block 605, order information associated with (e.g., representative or indicative of) a product order can be accessed at a product dispenser from a machine-readable item. The order information can include a group of order parameters that specify the product order. For instance, in certain embodiments, the group of order parameters can include one or more of a parameter indicative of type of product, a parameter indicative of an amount of product, a parameter indicative of a price category for the product, or a parameter indicative of a refill allowance for the product. As an illustration, as described herein, the machine-readable item can be embodied in or can include an RFID device, a key fob with a magnetic stripe, a card with a magnetic stripe, a wearable device (such as a bracelet), a mobile computing device, printed on a cup or other beverage vessel, or most any device (computing or otherwise) suitable or otherwise configured to be encoded with at least a portion of the order information.

Block 605 can be referred to as an accessing operation and can include receiving or otherwise acquiring the order information. In certain embodiments, acquiring the information can include probing the machine-readable item and, in response, collecting the order information. In an example embodiment in which the machine-readable item is embodied in or includes an RFID tag, at least a portion of the order information can be securely encoded on the RFID tag, and accessing at least a portion of the order information can include probing the RFID tag. In an example embodiment in which the machine-readable item is embodied in or includes a device, at least a portion of the order information can be securely encoded thereon, and accessing such information can include scanning the device. In certain scenarios, the device can be or can constitute one of a portable computing device or a portable non-computing device, and at least the portion of the information can be encoded on the device according at least to a barcode scheme including one or more of a linear barcode or a matrix barcode. Accessing at least the portion of the information can include scanning at least one of the linear barcode or the matrix barcode.

At block 610, it can be determined if the product order is valid. In one embodiment, a computing device functionally coupled (e.g., communicatively coupled) to the beverage dispenser can determine if the beverage order is valid based at least in part on one or more of the order information or other information associated with the machine-readable item. The computing device can embody or can be included in a controller (e.g., control unit 134) integrated into or otherwise coupled to the beverage dispenser. In example embodiments in which the machine-readable item is embodied in or constitutes an RFID tag, determining if the product order is valid can include analyzing an information structure representative of a manufacturer of the RFID tag. Validity of the product order can be determined based at least in part on content (e.g., data, metadata, and/or signaling) of the information structure—e.g., the product order can be deemed to be valid in response to the content being representative or otherwise indicative of a predetermined manufacturer; or the product order can be deemed to be invalid otherwise.

In a scenario in which it is ascertained that the product order is invalid, exception handling can be performed at block 615. In the alternative, in a scenario in which it is ascertained that the product order is valid, selection information associated with (e.g., representative or indicative of) a product selection can be received at the product dispenser at block 620. As described herein, the selection information can include a group of information structures that specify or otherwise characterize the selection of a product.

At block 625, it can be determined if the product selection is valid. In one embodiment, the computing device functionally coupled to the product dispenser can determine if the product selection is valid based at least in part on the group of order parameters and the group of selection parameters. Determining if the beverage selection is valid based at least in part on the group of order parameters and the group of selection parameters can include comparing at least one of the group of order parameters with at least one of the group of selection parameters. Such a determining operation can further include (i) configuring the beverage selection as valid in response to the comparing operation yielding an outcome within a predetermined range and/or that satisfies a predetermined validity criterion, and (ii) configuring the beverage selection as invalid in response to the comparing operation yielding an outcome outside the predetermined range and/or or that does not satisfy the predetermined validity criterion.

In response to determining that the product selection is invalid, exception handling can be performed at block 630. In certain implementations, performing exception handling can include supplying instruction(s) to the product dispenser of block 605 to render information indicative of a directive to the consumer to return to a POS (e.g., POS 102 of FIG. 1) for additional payment and/or make an alternative product selection. The product dispenser can render at least a portion of such information visually (e.g., graphically and/or textually), aurally, and/or mechanically (e.g., via a haptic interface device). In other implementations, performing exception handling can include supplying instruction(s) to the product dispenser of block 605 to prompt the consumer that provided the selection information to supply payment information to continue the dispense. At least a portion of the payment information can be received at an interface device (e.g., a card reader, a touch-screen display device, or the like) integrated into or otherwise functionally coupled to the product dispenser. In yet other implementations, in a scenario in which payment information associated with the consumer is available to the product dispenser, performing exception handling can include supplying instruction(s) to the product dispenser of block 605 to inform or otherwise convey to the consumer that an additional charge may be added to the consumer's account should the consumer proceed with the dispense. In addition or in the alternative, performing exception handling can include supplying instruction(s) to such a product dispenser in order to inform or otherwise convey to the consumer the current order parameter(s) and/or prompt the consumer to make a different beverage selection. At least a portion of the payment information can be available to the product dispenser via a network node (e.g., one of server(s) 152) that retains such information and is accessible via a network (e.g., one of network(s) 120) to a service operator associated with the product dispenser. In the alternative, in response to ascertaining that the product selection is valid, a product can be dispensed at the product dispenser based on the beverage order at block 635.

At block 640, it can be determined if the beverage order is fulfilled in response to the dispensing the product. In certain implementations, determining if the beverage order is fulfilled can include determining if a predetermined amount of the product has been substantially dispensed. At least one of the group of order parameters can specify the predetermined amount of the product. At block 650, the product order can be updated by the computing device in response to dispensing the beverage. In certain embodiments, updating the product order can include updating a record indicative of an amount of the beverage that is dispensed.

In certain embodiments, the subject example method can include associating, at the computing, a consumer to the product order based on at least a portion of the order information representative of the beverage order. In one implementation, associating the consumer to the product can include accessing information indicative of the consumer, such as age, gender, height, weight, other biometric information, a combination thereof, or the like. In certain implementations, accessing such information can include receiving or otherwise acquiring at least a portion of the information from the machine-readable item, wherein at least the portion of the information can be securely encoded. Various approaches can be implemented to securely encode such information in the machine-readable item. In one example implementation, information encoded in the machine-readable item can be encrypted. In another example implementation, information encoded in the machine-readable item can be scrambled according to a predetermined scrambling code.

Figure 7:
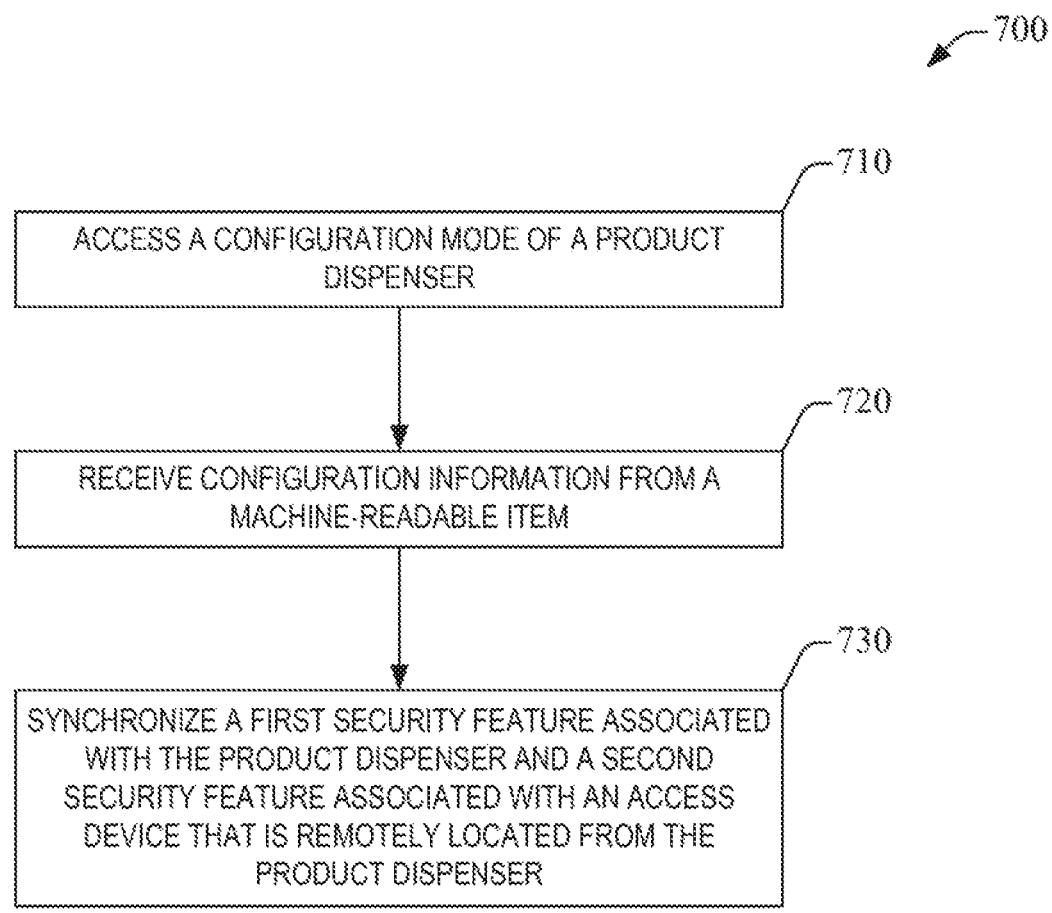

FIG. 7 illustrates a flowchart of an example method 700 for configuring a product dispenser in accordance with one or more embodiments of the disclosure. As illustrated, in one aspect, configuring the product dispenser can include securing the product dispenser to permit regulated dispense of a product in accordance with one or more aspects described herein. The subject example method can be implemented in combination with one or more methods of the disclosure. At block 710, a configuration mode of a product dispenser can be accessed. The configuration mode (which also may be referred to herein as "setup mode") can be accessed in response to information received from an I/O device integrated into or otherwise functionally coupled to the product dispenser. In one example scenario, a technician responsible or otherwise in charge for installation and/or maintenance of the product dispenser can access an interface (graphical or otherwise) rendered or otherwise provided at the I/O device (e.g., executing or otherwise operating on the I/O device) that permits supplying the information that permits access to the configuration mode.

At block 720, configuration information can be received at the product dispenser from a machine-readable item. As described herein, the machine-readable item can be embodied in or can include most any device (computing or otherwise) suitable or otherwise configured to be encoded with at least a portion of the order information—e.g., an RFID, a key fob with a magnetic stripe, a card with a magnetic stripe, a wearable device (such as a bracelet), a mobile computing device, or the like. In one scenario, the product dispenser can probe or otherwise interact with the machine-readable item, and in response, can receive or otherwise acquire at least a portion of the configuration information. For example, the machine-readable device can be embodied in or can include a portable computing device, such as a tablet computer, that can render a barcode containing the configuration information. The product dispenser can scan, via a reader device, for example, the barcode and read it (e.g., decode the barcode). In response, the product dispenser can receive the configuration information. For example, the reader device (e.g., a barcode scanner or reader) can communicate at least a portion of the information decoded from the barcode to a control unit and/or a memory device associated with the product dispenser.

At block 730, a first security feature associated with the product dispenser and a second security feature associated with an access device (e.g., POS 102) are synchronized. In certain embodiments, the access device (a portable computing device, such as a tablet computer) can be configured to operate at a remote location from the product dispenser. In one embodiment, the first security feature can include an encryption key and the second security feature can include the encryption key, where synchronizing the first and second security features can include receiving the encryption key from the access device, and configuring the encryption key at the product dispenser. In another embodiment, the first security feature can include a scrambling code and the second security feature can include a descrambling code associated with the scrambling code, where synchronizing the first and second security features can include receiving the scrambling code from the access device, and configuring the descrambling code associated with the scrambling code at the product dispenser.

Subsequent to synchronizing such security features, the configuration mode on the product dispenser can be exited.

Figure 8:
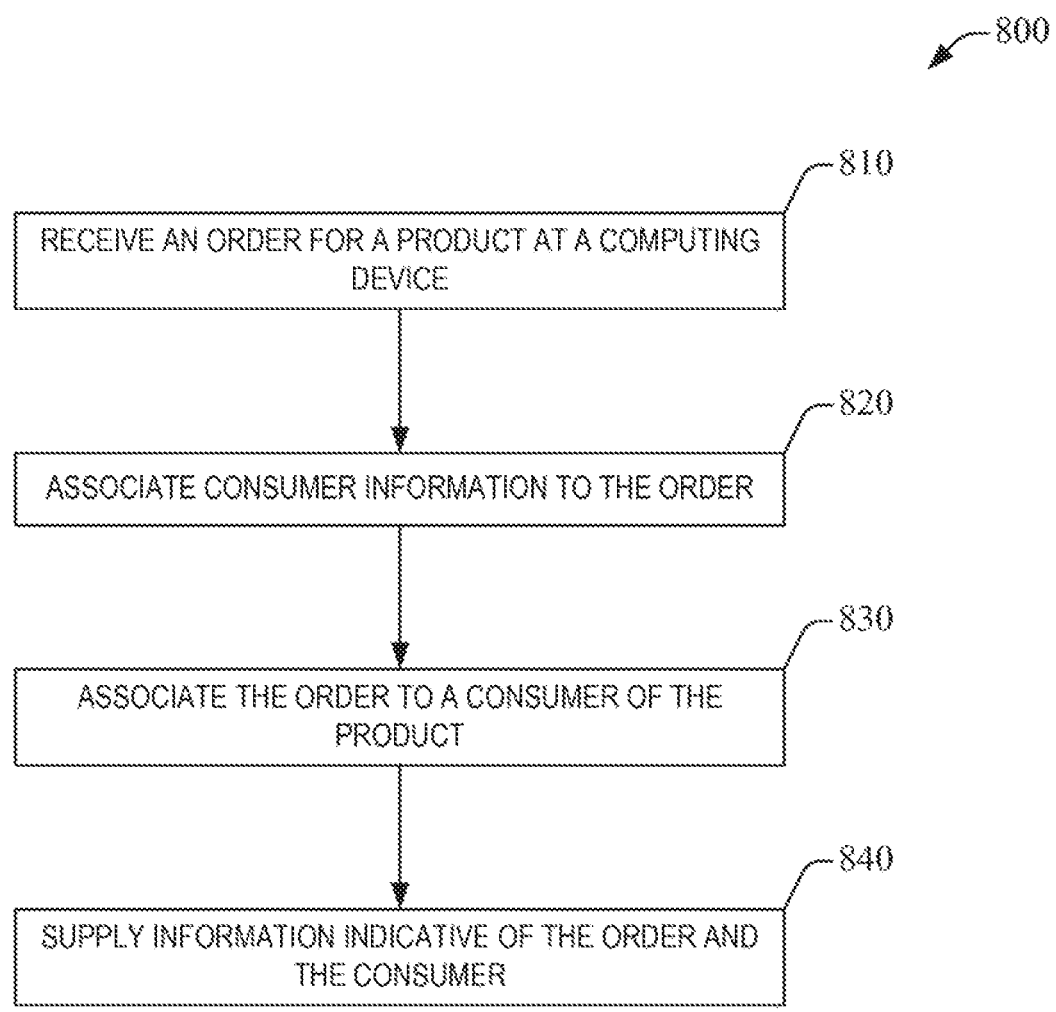

FIG. 8 illustrates a flowchart of an example method 800 for ordering a product in accordance with one or more embodiments of the disclosure. In certain implementations, a computing device that embodies or is functionally coupled to a point-of-sale (POS) device can implement (e.g., execute or perform, compile and execute, and so forth) one or more blocks of the subject example method. At block 810, an order for a product can be received at a computing device. The order can include a group of order parameters, including at least one of a prepaid amount of the product or a predetermined type of the product. As described herein, in certain embodiments, the computing device can embody or can constitute a POS device (e.g., POS 102).

At block 820, consumer information can be associated to the order. The computing device that receives the order can associate at least a portion of such information to the order. The consumer information can include information that characterizes (e.g., is indicative or otherwise representative of) a consumer, the consumer's ordering behavior, and/or an incentivation program (e.g., a loyalty program) associated with the consumer. As an illustration, in certain embodiments, associating the consumer information to the order can include one or more of associating information indicative of the consumer's age to the order; associating information indicative of a loyalty program pertaining to the consumer to the order; associating information indicative of a consumption restriction to the order; or associating information indicative of a dietary restriction of the consumer to the order. It should be appreciated that, in one aspect, associating the consumer information to the order can permit customizing the order and/or configuring regulation of dispense at a product dispenser configured to dispense a product associated with the order. For example, by associating information indicative of a consumption restriction/control to the order, dispense of products containing ingredients inadequate for lactose-intolerant consumers, diabetic consumers, and the like, can be prevented or otherwise mitigated.

In another aspect, associating the consumer information to the order can permit customizing the consumer's experience at the product dispenser. As an illustration, the subject example method can include associating dispensing information in response to associating information indicative of the consumer's age to the order, where the dispensing information can be configured to customize operation of the product dispenser. For instance, when operated upon or otherwise processed, the dispensing information can cause the product dispenser or a computing device functionally coupled thereto to configure an end-user interface based at least in part on at least a portion of the consumer information. The end-user interface can be embodied in or can include a graphical interface; an aural interface; a tactile interface; an interface that combines features of the foregoing interfaces; or the like.

At block 830, the order can be associated to the consumer of the product. The computing device can associate the order to the consumer. In one embodiment, associating the order to the consumer can include providing the consumer with a machine-readable item including order information representative or otherwise indicative of the order, where at least a portion of the order information is securely encoded on the machine-readable item. In one aspect, providing the consumer with such a machine-readable item can include encrypting at least the portion of the order information. In another aspect, providing the consumer with such a machine-readable item can include scrambling at least a portion of the order information prior to encoding the information on the machine-readable item. In another embodiment, providing the consumer with such a machine-readable item can include providing the consumer with a portable non-computing device comprising, for example, a wearable device, a card, a fob with a magnetic stripe, or the like. In yet another embodiment, providing the consumer with the machine-readable item can include printing or otherwise embedding a numeric code or an alphanumeric code on the consumer's receipt a product purchase. It can be appreciated that embedding such a code can be implemented in scenarios in which an electronic receipt is provided and rendered in an electronic device. In such an embodiment, the consumer can provide the code to the dispenser via a user interface (e.g., a keyboard, a keypad, a touch-surface display device, a camera, or the like). In still another embodiment, providing the consumer with the machine-readable item can include associating the order with the consumer's phone number or any other numeric or alphanumeric identifier (e.g., passport number or a portion thereof; social security number or a portion thereof; vehicle identification number of a vehicle associated with the consumer; or other identifying number that is unique to the consumer, and then prompting the consumer to input such a numeric identifier into the product dispenser.

An association between the order and the consumer of the product also can include a logical association between the order and identifying information indicative or otherwise representative of the consumer. In one implementation, associating the order to the consumer can include associating the order to biometric information pertaining to the consumer, which can include, in one aspect, acquiring at least a portion of the biometric information at the computing device that receives the order. To at least such an end, in certain embodiments, acquiring at least the portion of the biometric information pertaining to the consumer can include one or more of scanning a fingerprint of the consumer, scanning a retina of the consumer, recording a consumer's utterance or speech, identifying a facial feature of the consumer, measuring the consumer's height, measuring the consumer's weight, measurement of the consumer's blood pressure, measurement of the consumer's cholesterol level, measurement of the consumer's heart rate, measurement of the consumer's body temperature, measurement of the consumer's bone density, measurement of the consumer's insulin level, or a combination thereof. Various devices (e.g., a camera, a scale, a scanner, a combination thereof, or the like) can be functionally coupled to the POS to enable this functionality.

At block 840, information indicative of the order and the consumer can be supplied by the computing device. Block 840 can be referred to as a supplying operation and, in one aspect, can include communicating at least a portion of such information to a product dispenser.

Figure 9:
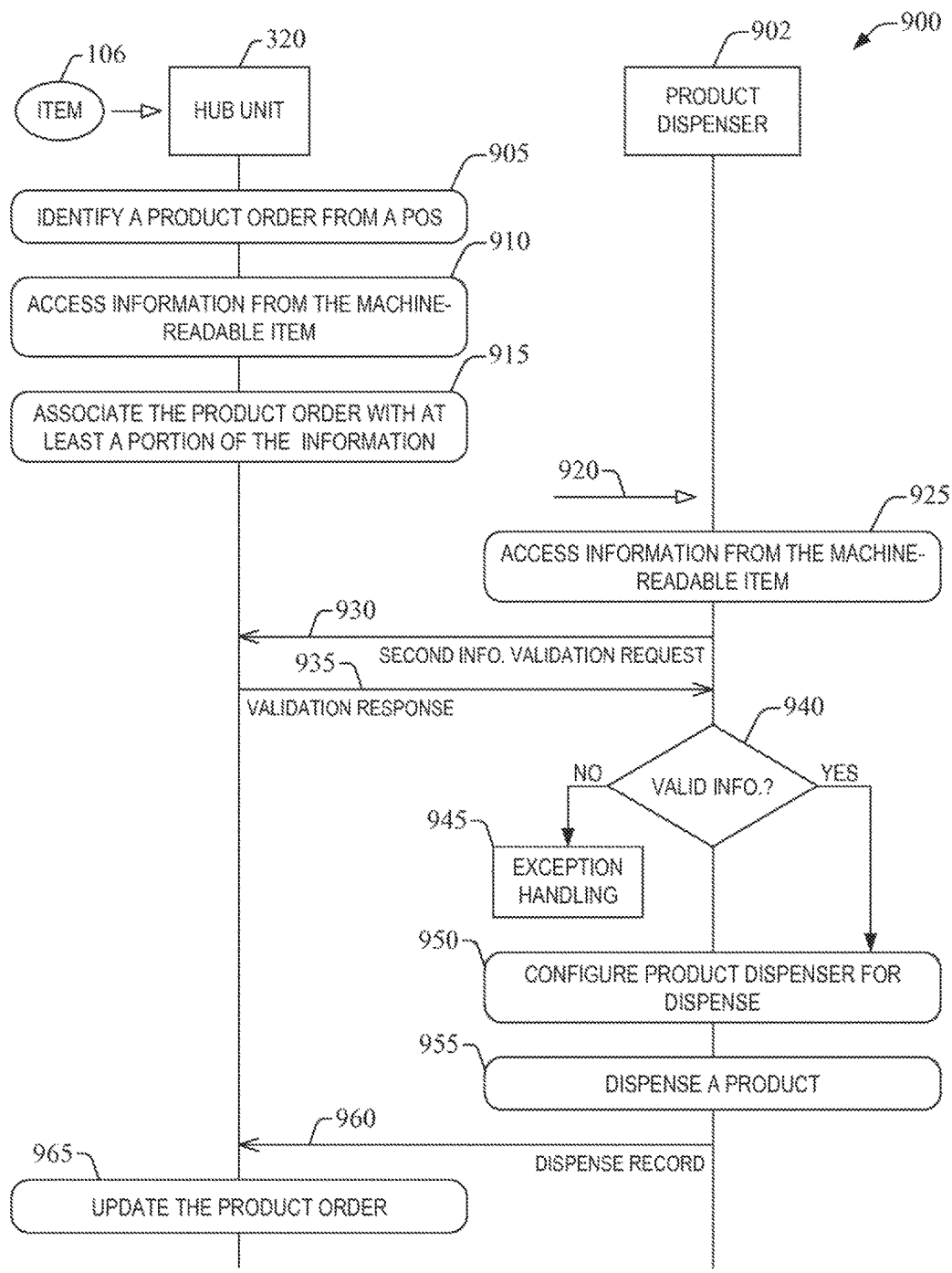

FIG. 9 illustrates a flowchart of an example method 900 for dispensing a beverage in accordance with one or more embodiments of the disclosure. The subject example method can be implemented by a product dispenser and/or one or more computing devices functionally coupled thereto. As illustrated, the hub unit 320 can interact with a machine-readable item 106 (e.g., a cup or a vessel) which can be encoded with indicia or a code. At block 905, the hub unit 320 can identify a product order from a point of sale, such as POS 102. At block 910, the hub unit 320 can access (e.g., machine-read and decode) information from the machine-readable item 106. At block 915, the hub unit 320 can associate the product order with at least a portion of the accessed information. As described herein, the hub unit 320 can generate one or more order records, such as record 400, and form a database of product orders for regulation of dispense of a beverage in accordance with aspects of this disclosure.

As illustrated at 920, the machine-readable item 106 can be caused to interact with a product dispenser 902, which can be embodied in or can include one of the product dispenser(s) 130. At block 925, the product dispenser 902 can access information from the machine-readable item 106. In one aspect, accessing the information can include reading or scanning the machine-readable item 106 via a reader device or other acquisition unit present or functionally coupled to the product dispenser 902. As described herein, in certain embodiments, the product dispenser 902 can utilize or leverage an interface integrated therein or functionally coupled thereto in order to access information from the machine-readable item 925. More specifically, yet not exclusively, in one of such embodiments, the product dispenser 902 can receive input information (e.g., an alphanumeric string) indicative or representative of the information contained in the machine-readable item 106.

At block 930, the product dispenser 902 can communicate a request for validation of second information (e.g., at least a portion of the information accessed from the machine-readable item 106) to the hub unit 320. In response, the hub unit 320 can analyze the second information (e.g., a serial number encoded in the machine-readable item 106), and at block 935, can communicate a validation response indicative or otherwise representative of validity or invalidity of the second information. The product dispenser 902 can receive the validation response and can determine if the information accessed from the machine-readable item 106 is valid. In response to ascertaining that the information is invalid, the product dispenser 902 can perform exception handling as described herein. In the alternative, in response to ascertaining that the information is valid, the product order associated with at least the portion of the information accessed from the machine-readable item 106 can be deemed valid, and thus, the product dispenser 902 can be configured for dispense at block 950. For example, product selections can be unlocked or otherwise made available and rendered on an interface of the product dispenser based at least on the product order. At block 955, the product dispenser 902 can dispense a product in accordance with a product selection based on the product order. At 960, the product dispenser 902 can communicate information indicative of a dispense record to the hub unit 320. As described herein, such information can be referred to as pour information and can be utilized or otherwise leveraged by the hub unit 320 to update the product order at block 965.

Figure 10:
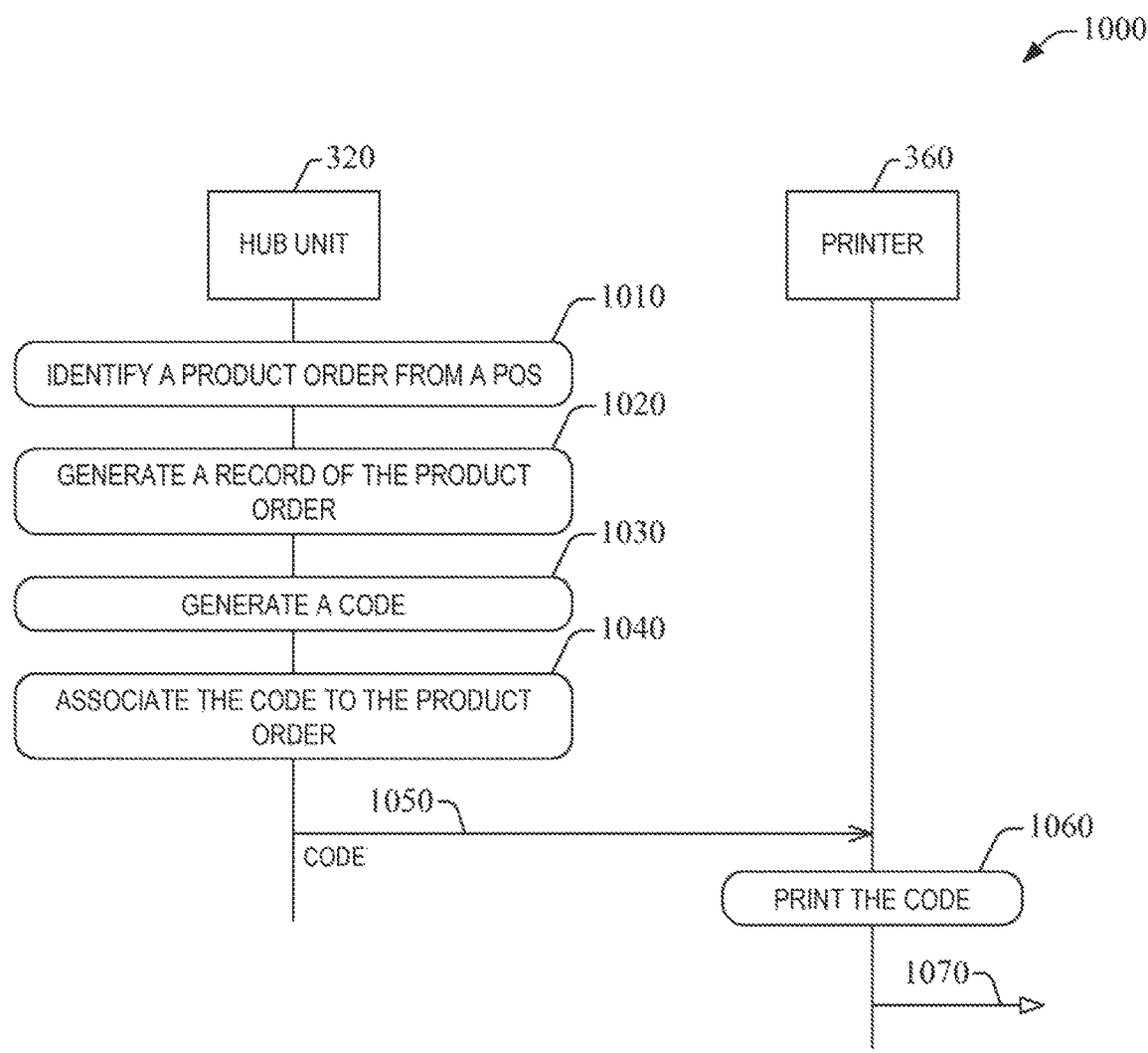

In the example method 900, blocks 905, 910, and 915 may be referred to as a product order configuration process. As described herein, the order configuration process can rely on a machine-readable item (e.g., machine readable item 106) in order to configure a product order and/or update it. While in the example method 900, the machine-readable item contains or is otherwise embedded with a code (e.g., an alphanumeric code) and the hub unit 320 accesses it, in other embodiments, the hub unit 320 can either generate a code or indicia or receive a code without reliance on the machine readable item. As an illustration, FIG. 10 presents an example embodiment 1000 of product order configuration in which the hub unit 320 generates the code. The subject example method can be combined with blocks 920-965 described in connection with example method 800. At block 1010, the hub unit 320 can identify or otherwise determine a product order from a point of sale (e.g., POS 102). At blocks 1020 and 1030, the hub unit 320 can generate, respectively, a record of the product order (see, for example, the record shown in FIG. 4) and a code (e.g., an alphanumeric code). At block 1040, the hub unit 320 can associate the code to the product order. As described herein, associating the code with the product order may include incorporating the code into the record of the product order, where the code may be utilized or otherwise leveraged as key to access product order information. In addition, the hub unit 320 can be functionality coupled to a printer 360, and at 1050, the hub unit 320 can communicate the code to the printer 360. The printer 360 can receive the code and can print it or otherwise embed it on a machine-readable item, such as a plastic label, a paper label, or a label formed from a fibrous material suitable for printing. The printer can provide the machine-readable item at 1070. In some embodiments, the code may be provided from the hub unit 320 to a personal electronic device of the consumer. The dispenser may receive such a code via the consumer's personal device.

In embodiments of the disclosure, scannable barcodes may be preprinted, for example on beverage cups or other vessels. Preprinted scannable codes may be preprogrammed or associated with certain parameters or credentials, or may be individually programmed at a point of sale (POS) or at another promotional or distribution location. For example, preprinted scannable codes on a plurality of beverage cups may be preprogrammed to authorize dispensing of a certain number of refills at a beverage dispenser, and the beverage cups may be distributed by a merchant at a merchant's POS site. Other preprinted barcodes may be authorized for a certain number of refills of the beverage cups at a point of sale. During programming, a user may configure, via one or more inputs, one or more parameters associated with respective scannable barcodes, or may otherwise customize interactions a buyer of the beverage vessel with the preprinted scannable code can have with a dispenser. The user or seller inputs may be logged, such as at a remote server, which may be in communication with the dispenser and may authorize dispensing by the dispenser based on the scannable barcode. Embodiments described herein may result in reduced costs related to dispensing beverages and beverages generally, and may result in reduced wear and tear on dispenser systems by reducing excessive dispensing operations, thereby extending a life of components of the dispenser system.

In one example embodiment, a printer associated with a POS may print a scannable barcode. The scannable barcode may be time coded, in that the scannable barcode may be valid for use at a dispenser for a specific length of time. The scannable barcode may be printed in response to an input on the printer in some embodiments. In some embodiments the scannable barcode may be printed in response to either an input at the POS or at the printer. Time information, such as validity timing or activation timeframe, dispensable volume information, such as a maximum dispense volume, and the like may be associated with or encoded on the scannable barcode and/or beverage vessel if the scannable barcode is preprinted on the beverage vessel.

The scannable barcodes may be preprinted on cups or beverage vessels, such that the cups have the barcodes when a user receives the cup. In such instances, the preprinted barcodes may be one of a set of recurring barcodes. The POS and/or product dispenser may include on-machine tracking to determine, for example, a first dispense time and/or first refill incident and the like. The on-machine tracking at the POS or the product dispenser may be configured to be reset periodically or in sequence. In some example embodiments, product dispensers may be coupled to or otherwise connected with and/or in communication with a barcode scanner. Example connections between the product dispenser and the barcode scanner may be wired or wireless connections such as WiFi or USB 3.0 connections.

Upon determining that the scannable barcode is valid, the product dispenser may temporarily prevent additional beverage from being dispensed to a vessel associated with a particular scannable barcode. For example, the product dispenser may set a minimum length of time in between first and second dispense events for a particular scannable barcode. The minimum length of time may be, for example, 5 minutes, 15 minutes, or another length of time. The minimum length of time may prevent two different people from consuming a single beverage using the same scannable barcode.

Figure 11:
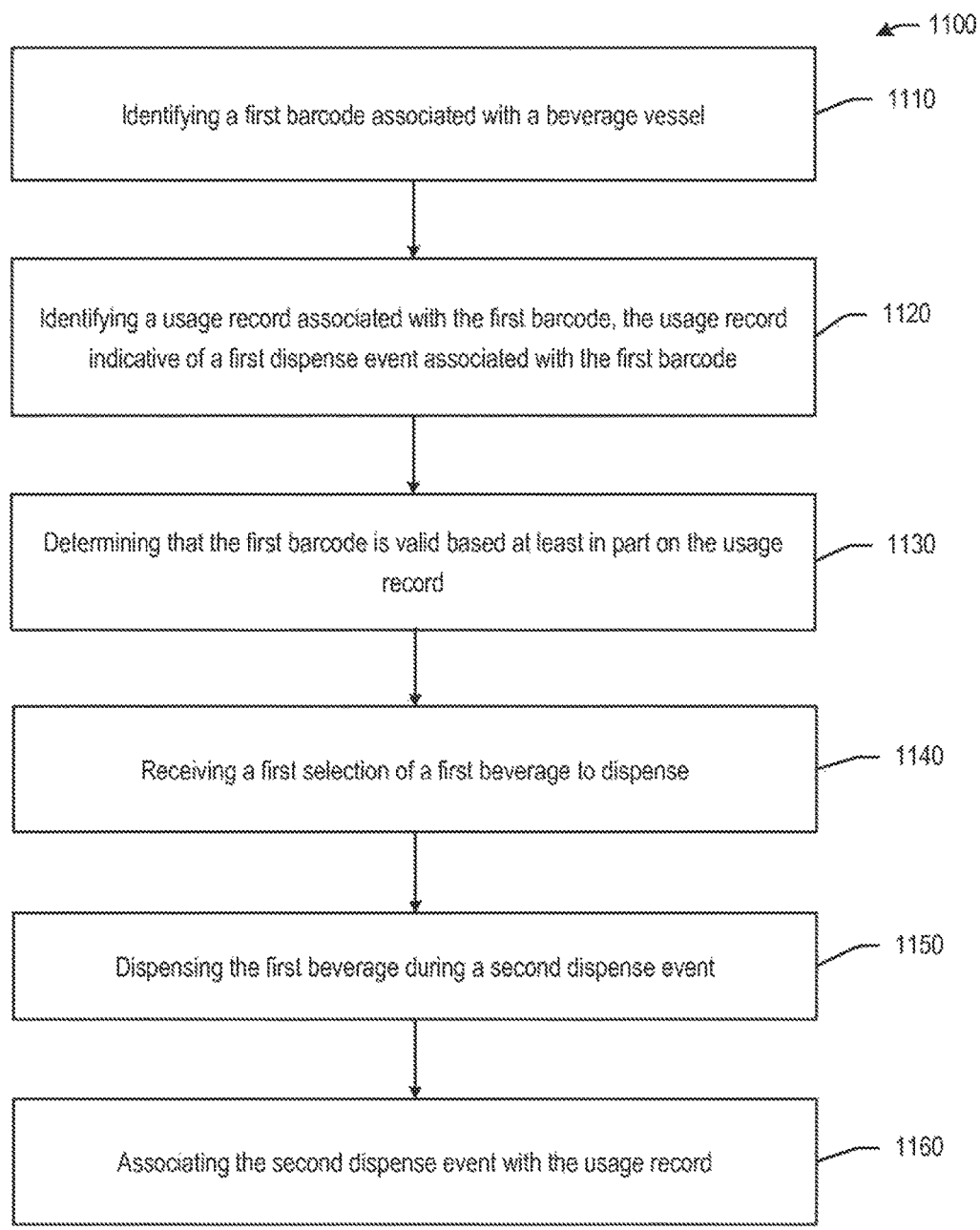

Referring to FIG. 11, an example method 1100 is illustrated in accordance with one or more embodiments of the disclosure. At block 1110, the method 1100 includes identifying a first barcode associated with a beverage vessel. For example, a barcode, such as any suitable machine-readable code or scannable code (e.g., QR code, RFID tag, etc.), may be associated with a beverage vessel or other container configured to receive a beverage or other product. The barcode may be pre-printed on the beverage vessel or may be otherwise attached or affixed to the beverage vessel, such as via an adhesive or otherwise integrated with the vessel. Block 1100 may be performed by a product or beverage dispenser. In one embodiment, a beverage dispenser may be in communication with a scanning device configured to identify barcodes.

At block 1120, the method 1100 includes identifying a usage record associated with the first barcode, the usage record indicative of a first dispense event associated with the first barcode. The usage record may be a historical record of interactions associated with the barcode and one or more beverage dispensers of the systems described herein, and may include a validity indicator. For example, a usage record may indicate previous dispense events associated with a barcode. The usage record may be for a fixed time period preceding the time at which the usage record is identified. In one example, usage records may automatically be reset periodically, such as every 24 hours or every 30 days, so as to facilitate the use of repeating barcodes. Dispense events may occur when product or beverage is dispensed by a product dispenser in response to activation of the dispenser upon scanning or identifying a barcode. In one embodiment, a dispense event may include information including, but not limited to, a time of dispensing, a location of dispensing, a volume or amount of product dispensed, a type of product dispensed, a refill increment value indicative of a beverage refill event, and other information. The usage record for a particular barcode may include some or all of the dispense event information associated with a barcode.

At block 1130, the method 1100 includes determining that the first barcode is valid based at least in part on the usage record. In one embodiment, usage records may include a validity indicator in addition to or as part of historical interaction records. The validity indicator may be configured to authorize a product dispenser to dispense beverage or product, or to otherwise unlock. The validity indicator may be determined, for example, based on one or more of a number of factors, such as information included in the usage record, or other information, such as a dispenser configuration, as described herein. For example, a dispenser may be configured such that a barcode is valid for 3 hours after a first dispense event, or until a predetermined volume of beverage is dispensed to the barcode, or a certain number of refill events have occurred, or other parameters.

At block 1140, the method 1100 includes receiving a first selection of a first beverage to dispense. Upon determining that the first barcode is valid at block 1130, the dispenser may receive, for example, from a user of the dispenser, a selection of a beverage to dispense.

Block 1150 includes dispensing the first beverage during a second dispense event. In one example, because the dispenser is authorized or unlocked in response to the barcode being valid, the dispenser may dispense the selected beverage during a second dispense event.

Block 1160 includes associating the second dispense event with the usage record. For example, the dispenser may update or otherwise associate the second dispense event with the usage record of the first barcode, to maintain an accurate usage record. In some embodiments, upon associating or updating a usage record for a barcode, the method may automatically determine validity of the barcode for subsequent dispense events. For example, if the first barcode is authorized for a total of two dispense events, upon determining that the first barcode is associated with two dispense events, the dispenser system may determine that the first barcode is no longer valid and may generate a validity indicator that indicates the barcode is not valid for association with the usage record of the first barcode.

In one example embodiment of the method 1100 of FIG. 11, upon associating the second dispense event with the usage record of the first barcode at block 1160, a dispenser system may receive a second selection of a second beverage to dispense. Upon receiving the second selection, the dispenser system may identify the usage record associated with the first barcode, and may determine a total number of dispense events associated with the first barcode based at least in part on the usage record. The usage record may indicate, via the historical interaction data, that the first barcode is associated with a total number of dispense events of the first dispense event and the second dispense event. The dispenser system may determine that the total number of dispense events exceeds a maximum dispense event value associated with the first barcode, and may prevent dispensing of the second beverage. The maximum dispense event value may be a number of dispense events allowed for a particular barcode, and may be indicated by or otherwise associated with the usage record of a barcode. For example, the maximum dispense event value may be set to a total of 3 dispense events, which would allow a user with a barcode to engage in 3 dispense events with a dispenser of the dispenser system, after which the barcode would no longer be valid. As a result, the dispenser system may control or otherwise manage a number of times a barcode may be used to dispense product from a dispenser of the dispenser system. In embodiments where usage records are periodically reset or cleared, the total number of dispense events may also be cleared, so as to facilitate the use of recurring barcodes.

In another example embodiment or in addition to the embodiment described above with respect to the maximum dispense event value, the usage record of the method 1100 of FIG. 11 may include a first dispensed beverage volume associated with the first dispense event and a second dispensed beverage volume associated with the second dispensed event. In some embodiments, the dispenser system may track or otherwise determine a volume of dispensed beverage associated with individual dispense events, which may facilitate control over amounts or volumes of product dispensed to particular barcodes. For example, upon associating the second dispense event with the usage record of the first barcode at block 1160, a dispenser of the dispenser system may receive a second selection of a second beverage to dispense, and may identify the usage record associated with the first barcode. Upon identifying the usage record, the dispenser may determine a total volume of dispensed beverage associated with the first barcode based at least in part on the usage record. The dispenser may determine that the total volume of dispensed beverage exceeds a maximum dispensed beverage volume value associated with the first barcode. The maximum dispensed beverage volume value may indicate a total volume of beverage dispensable in response to a valid barcode, either for an individual dispense event, or over multiple dispense events associated with the particular barcode. For example, the dispenser may determine that a particular barcode has a maximum dispensed beverage volume of 16 fluid ounces per dispense event, and/or 48 fluid ounces for all dispense events associated with the barcode. Accordingly, in one embodiment, a dispenser may be configured to dispense a particular volume of beverage in response to a particular barcode. The barcode may be associated with a beverage vessel of a particular size, which may facilitate control over volume of dispensed beverage. For example, if a barcode indicates a maximum dispensed beverage volume for an individual dispense event to be 12 fluid ounces because the beverage vessel associated with the barcode has a capacity of 12 fluid ounces, the dispenser may stop dispensing or end a dispense event after dispensing 12 fluid ounces. Such embodiments may prevent a user from purchasing a beverage vessel with a certain capacity and dispensing beverage into a larger vessel. The dispenser may determine the total volume of dispensed beverage exceeds the maximum dispensed beverage volume value associated with the first barcode, and as a result, may prevent dispensing of the second beverage. In some embodiments, the dispenser may have a tolerance at which to continue dispensing beverage in excess of the maximum dispensed beverage volume value. For example, if a user dispenses a certain volume of a beverage and changes his or her mind, the user may be able to dispense additional beverage until reaching the tolerance allowed by the dispenser. Tolerances may be specific to barcodes or types of barcodes (e.g., tolerances may increase with increased beverage vessel capacities), or may be applicable to all barcodes. Tolerances may be represented by percentage values (e.g., 110% of maximum, etc.) and/or absolute values (e.g., +200 mL, etc.).

In another example embodiment, which may also include the maximum dispense event value and/or maximum dispensed beverage volume value aspects of the disclosure, the usage record of the method 1100 may include a first timestamp associated with the first dispense event and a second timestamp associated with the second dispensed event. The dispenser system may determine a time associated with particular dispense events so as to determine if a particular barcode is valid for dispensing at the time of receiving or scanning the barcode. In some embodiments, barcodes may be invalid for a certain time interval after a dispense event, so as to prevent a user from dispensing beverage to fill more than one beverage vessel using the same barcode. To prevent such dispensing, a minimum refill time interval may be set, during which a barcode is not valid for dispensing. For example, after a dispense event is complete, a barcode may be invalid for 10 minutes until the barcode is valid again for dispensing, for example, a refill. For example, upon associating the second dispense event with the usage record of the first barcode at block 1160, a dispenser of the dispenser system may receive a second selection of a second beverage to dispense, and may identify the usage record associated with the first barcode. The dispenser may identify the second timestamp based at least in part on the usage record, and may determine a refill time interval between the second timestamp and a current time. The refill time interval may be a time between a current or present time, at which the barcode was scanned, and a time of an immediately prior dispense event. If a user attempts to dispense a beverage in an instance where the refill time interval has not yet passed, the dispenser may determine that the refill time interval is less than a minimum refill time interval associated with the first barcode, and as a result, may prevent dispensing of the second beverage. The minimum refill time interval may be predetermined for all barcodes or may be specific to barcodes. For example, minimum refill times for barcodes associated with relatively low capacity beverage vessels may be lower than minimum refill time intervals for larger beverage vessels.

In another example embodiment, which may also include the maximum dispense event value, maximum dispensed beverage volume value, and/or minimum refill time interval aspects of the disclosure, the usage record of the method 1100 may include a first timestamp associated with the first dispense event and a second timestamp associated with the second dispensed event. In some embodiments, barcodes may be valid for a certain amount of time after a first dispense event, so as to prevent users with barcodes previously obtained (e.g., 24 hours old, etc.) from dispensing additional product or beverage. The dispenser system may determine a time associated with particular dispense events so as to determine if a particular barcode is valid for dispensing at the time of receiving or scanning the barcode. In some embodiments, barcodes may have an activation time frame, or may otherwise be valid for a certain time interval after a first dispense event, so as to prevent a user from dispensing beverage, for example, a day after purchasing a beverage vessel or barcode. Upon associating the second dispense event with the usage record of the first barcode at block 1160, a dispenser of the dispenser system may receive a second selection of a second beverage to dispense, and may identify the usage record associated with the first barcode. The dispenser may determine an activation timeframe associated with the first barcode, where the activation timeframe may be indicative of a length of time the first barcode is valid after a first or most recent dispense event. The activation timeframe may be a length of time from a first dispense event, or a most recent dispense event, that a barcode is valid. For example, an activation timeframe may be represented as +4 hours after a first dispense event, or +1 hour from a most recent dispense event. The dispenser may identify the first timestamp based at least in part on the usage record, and may determine an elapsed length of time between the first timestamp and a current time. The dispenser may determine that the elapsed length of time exceeds the activation timeframe associated with the first barcode, and as a result, may prevent dispensing of the second beverage. In some embodiments, the dispenser system may automatically deactivate the first barcode at an end of the activation timeframe.

In certain embodiments, dispenser systems implementing one or more methods described herein may also reset the usage record associated with the first barcode a predetermined time interval after the first dispense event. For example, usage records may be reset every 12 hours, 24 hours, manually, or the like. Embodiments of the disclosure may determine a dispensable volume associated with a beverage vessel associated with a barcode, and may automatically end a dispense event upon dispensing the dispensable volume of the first beverage. Dispensable volumes may be equal to or greater than a capacity of a beverage vessel.

Figure 12:
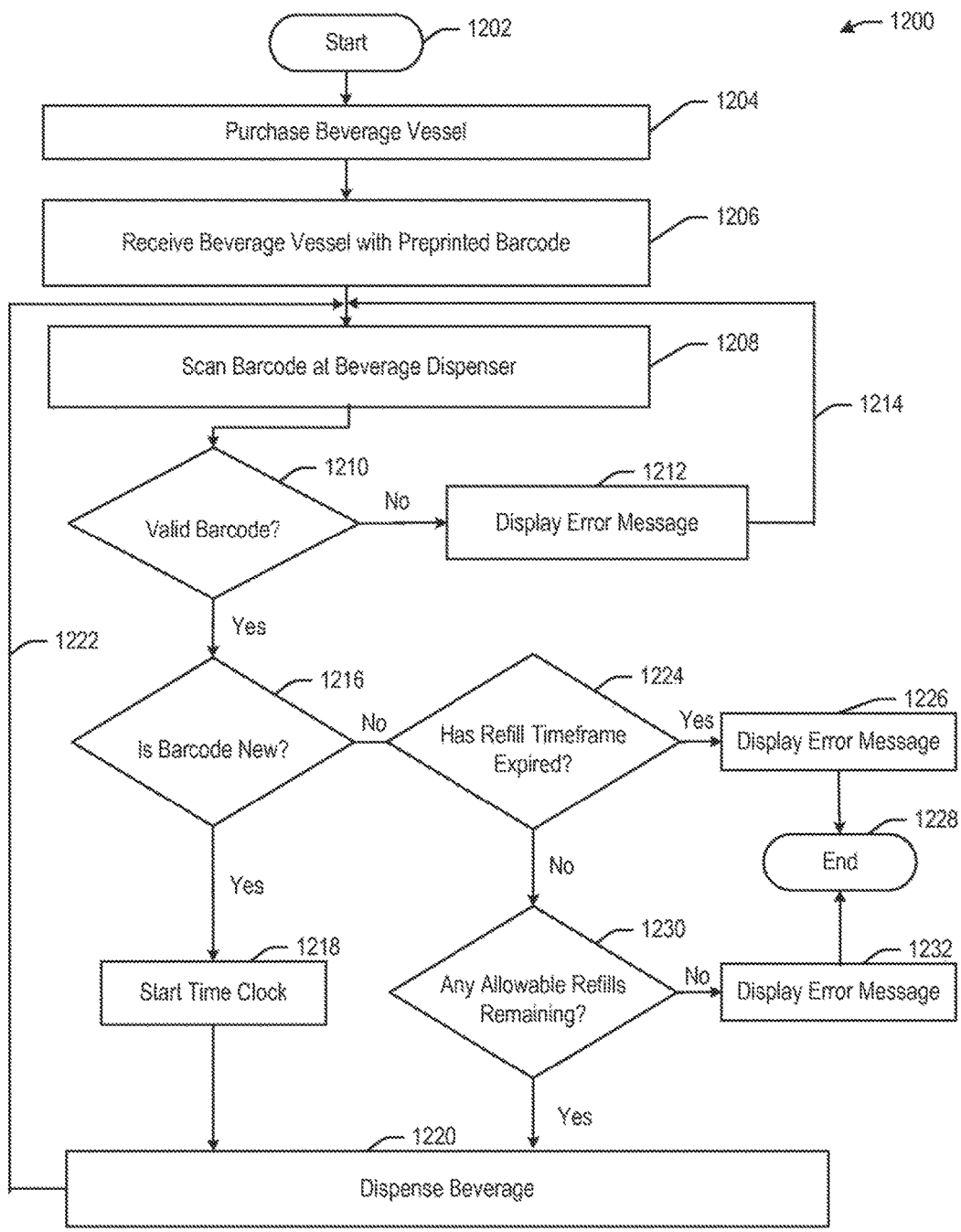
FIGS. 12-13 illustrate example process flows in accordance with one or more embodiments of the disclosure.

Referring to FIG. 12, an example process flow 1200 is depicted in accordance with one or more embodiments. The process flow 1200 may start at block 1202. At block 1204, a user may purchase a beverage vessel. The beverage vessel may be a cup or other vessel configured to retain fluid, in one example. At block 1206, the user may receive the beverage vessel, which may have a preprinted barcode on or otherwise affixed to the beverage vessel. In some embodiments, the barcode may be a smartchip or smart tag, such as an RFID tag. At block 1208, the user may scan the barcode associated with the beverage vessel at a beverage dispenser. The barcode may be any suitable machine readable code and may be preprinted on the beverage vessel or may be otherwise affixed or attached thereon. The beverage dispenser may receive information associated with the barcode from a scanner configured to scan the barcode that is associated with the beverage dispenser. Upon scanning the barcode at the beverage dispenser, the dispenser may make a determination of validity at determination block 1210. In one example, the dispenser may compare a barcode identifier associated with the barcode to a set of one or more valid barcode identifiers or recognized barcode identifiers. The dispenser may have the set of one or more valid barcode identifiers or recognized barcode identifiers stored locally or may otherwise have access to the set of one or more valid barcode identifiers via one or more networks. In another example the dispenser may determine that the barcode is valid if there is no previous usage record associated with the barcode. If the barcode is not valid, or in response to a negative determination by the dispenser, at block 1212 an error message may be displayed at the beverage dispenser and the process may proceed to block 1214 awaiting scanning of a barcode at the beverage dispenser.

In response to a positive determination at block 1210, or if it is determined by the dispenser that the barcode is valid, the process flow 1200 may proceed to determination block 1216, at which a determination is made by the dispenser of whether the barcode is new, or is not otherwise associated with a usage record. For example, the dispenser may analyze a set of one or more usage records to determine whether the barcode is associated with a usage record. If not, the dispenser may determine that the barcode is new. If it is determined that the barcode is new, or in response to a positive determination, the process flow 1200 proceeds to block 1218, at which a time clock is started. The start time, or the time at which the time clock is started may be associated with a usage record of the barcode. In some embodiments, the time clock may be a timer that starts at a predetermined length of time and reduces until reaching zero. In other embodiments, the dispenser may generate a timestamp and start a time clock counting up, and may use the timestamp as a reference time to determine an elapsed length of time since the timestamp. Upon starting the time clock, at block 1220, the beverage dispenser may dispense a beverage, which may be selected by the user. Upon dispensing the beverage, the process flow 1200 may return to awaiting scanning of a barcode at the beverage dispenser 1222.

In response to a negative determination at determination block 1216, or if the barcode is not new or is otherwise associated with a usage record indicating historical use or related data, the process flow 1200 may proceed to determination block 1224. At determination block 1224, a determination may be made by the dispenser as to whether a refill timeframe has expired. A refill timeframe may be a length of time after a first use that refills may be dispensed. For example, a user may have 2 hours after a first use during which to obtain a certain number of refills. The dispenser may determine, for example, the elapsed length of time from the timestamp generated by the dispenser to determine whether the refill timeframe has expired. In response to a positive determination, or if the refill timeframe has expired, the process flow 1200 may proceed to block 1226, at which an error message is displayed at the beverage dispenser. Upon displaying the error message, the process flow 1200 may end at block 1228.

In response to a negative determination at block 1224, or if the refill timeframe has not expired, the process flow 1200 may proceed to determination block 1230, at which a determination may be made by the dispenser as to whether any allowable refills remain. For example, a barcode may be used for a certain number of refills (e.g., 2 refills, 3 refills, etc.). The dispenser may determine an increment value or number of refill events associated with the barcode via the usage record of the particular barcode, and may compare the value to an allowable refill value to determine whether allowable refills remain. If there are no allowable refills remaining, or in response to a negative determination, the process flow 1200 may proceed to block 1232, at which an error message is displayed at the beverage dispenser. Upon displaying the error message, the process flow may end at block 1226.

In response to a positive determination at block 1230, or if there are allowable refills remaining, the dispenser may dispense beverage at block 1220. Upon dispensing beverage, the process flow 1200 may proceed to awaiting scanning of a barcode at the beverage dispenser 1222. In some embodiments, the process flow 1200 may include incrementing, by the dispenser, a refill count associated with the usage record of the barcode upon dispensing beverage.

Figure 13:
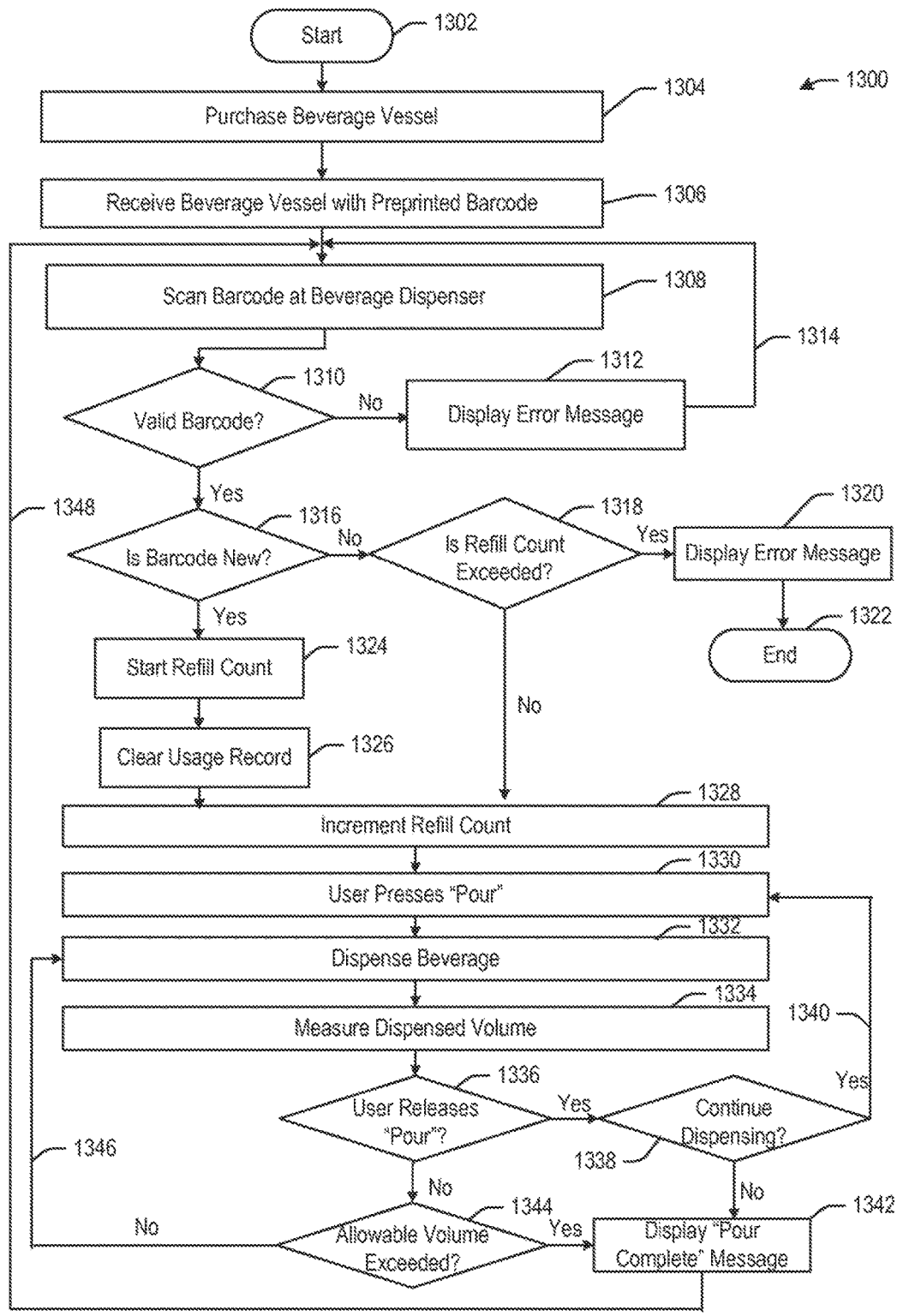

Referring to FIG. 13, an example process flow 1300 is depicted in accordance with one or more embodiments. The process flow 1300 may start at block 1302. At block 1304, a user may purchase a beverage vessel, for example at a point of sale device which may be at a beverage dispenser or otherwise in communication with a beverage dispenser. At block 1306, the user may receive the beverage vessel with a preprinted barcode. The beverage vessel may be a cup or other vessel configured to retain fluid, in one example. At block 1308, the user may scan the preprinted barcode at a beverage dispenser. The barcode may be any suitable machine readable code. The beverage dispenser may receive information associated with the barcode from a scanner configured to scan the barcode that is associated with the beverage dispenser. Upon scanning the barcode at the beverage dispenser, a determination of validity is made at determination block 1310. In one example, the dispenser may compare a barcode identifier associated with the barcode to a set of one or more valid barcode identifiers or recognized barcode identifiers. The dispenser may have the set of one or more valid barcode identifiers or recognized barcode identifiers stored locally or may otherwise have access to the set of one or more valid barcode identifiers via one or more networks. In another example the dispenser may determine that the barcode is valid if there is no previous usage record associated with the barcode. If the barcode is not valid, or in response to a negative determination, at block 1312 an error message may be displayed at the beverage dispenser and the process may proceed to awaiting scanning of a barcode at the beverage dispenser 1314.

In response to a positive determination at block 1310, or if it is determined that the barcode is valid, the process flow 1300 may proceed to determination block 1316, at which a determination is made by the dispenser of whether the barcode is new, or is not otherwise associated with a usage record. For example, the dispenser may analyze a set of one or more usage records to determine whether the barcode is associated with a usage record. If not, the dispenser may determine that the barcode is new. In response to a negative determination at determination block 1316, or if the barcode is not new or is otherwise associated with a usage record indicating historical use or related data, the process flow 1300 may proceed to determination block 1318. At determination block 1318, a determination may be made by the dispenser as to whether a refill count has been exceeded. The dispenser may determine an increment value or number of refill events associated with the barcode via the usage record of the particular barcode, and may compare the value to an allowable refill value to determine whether allowable refills remain. In response to a positive determination, or if the refill count has been met or exceeded, the dispenser may proceed to block 1320, at which an error message is displayed at the beverage dispenser. Upon displaying the error message, at the process flow 1300 may end at block 1322.

In response to a positive determination at determination block 1316, or if the barcode is new, the process flow 1300 may proceed to block 1324, at which a refill count is started. For example, the dispenser may generate an incremental refill count with an initial value of 0 or 1. Upon starting a refill count, the process flow 1300 may proceed to block 1326, at which a usage record associated with the barcode is cleared.

Upon clearing the usage record, the process flow 1300 may proceed to block 1328, at which the refill count associated with the barcode is incremented. For example, the dispenser may increase or increment the refill count to a subsequent value (e.g., from 1 to 2, from 2 to 3, etc.) Alternately, in response to a negative determination at determination block 1318, or if the refill count has not been exceeded, the process flow 1300 may continue to block 1328 and increment the refill count associated with the barcode.

Upon incrementing the refill count, the process flow 1300 may proceed to block 1330, at which the user presses "pour" or otherwise initiates dispensing at the beverage dispenser. At block 1332, the beverage dispenser may dispense beverage. At block 1334, the beverage dispenser may measure a dispensed volume. For example, the beverage dispenser may determine a dispensed volume by calculating a flow rate and a length of dispense time to generate a dispensed volume.

At determination block 1336, a determination is made by the dispenser of whether the user released "pour" or otherwise ceased dispensing. In response to a positive determination, or if the user released "pour" or ceased dispensing, the process flow 1300 may proceed to determination block 1338, at which a determination is made by the dispenser of whether the user would like to continue dispensing. For example, the user may be prompted at a display of the dispenser as to whether to continue dispensing. In response to a positive determination, the process flow 1300 may return to the user pressing "pour" 1340. In response to a negative determination at determination block 1338, or if the user does not want to continue dispensing, the process flow 1300 may continue to block 1342, at which a "pour complete" message is displayed at the dispenser, and the process flow 1300 may proceed to awaiting scanning of a barcode at the dispenser 1348.

In response to a negative determination at determination block 1336, or if the user does not release "pour," the process flow 1300 may proceed to determination block 1344, at which a determination is made by the dispenser as to whether an allowable volume has been exceeded. For example, a barcode may be authorized for or have an allowable volume of 16 fluid ounces per dispense event. In response to a negative determination at determination block 1344, or if the allowable volume has not been exceeded, the process flow 1300 may proceed to continue dispensing beverage 1346. In response to a positive determination, or if the allowable volume has been exceeded, the process flow 1300 may proceed to block 1342, at which a "pour complete" message is displayed, and the process flow 1300 may proceed to awaiting scanning of a barcode at the dispenser 1348.

Figure 14:
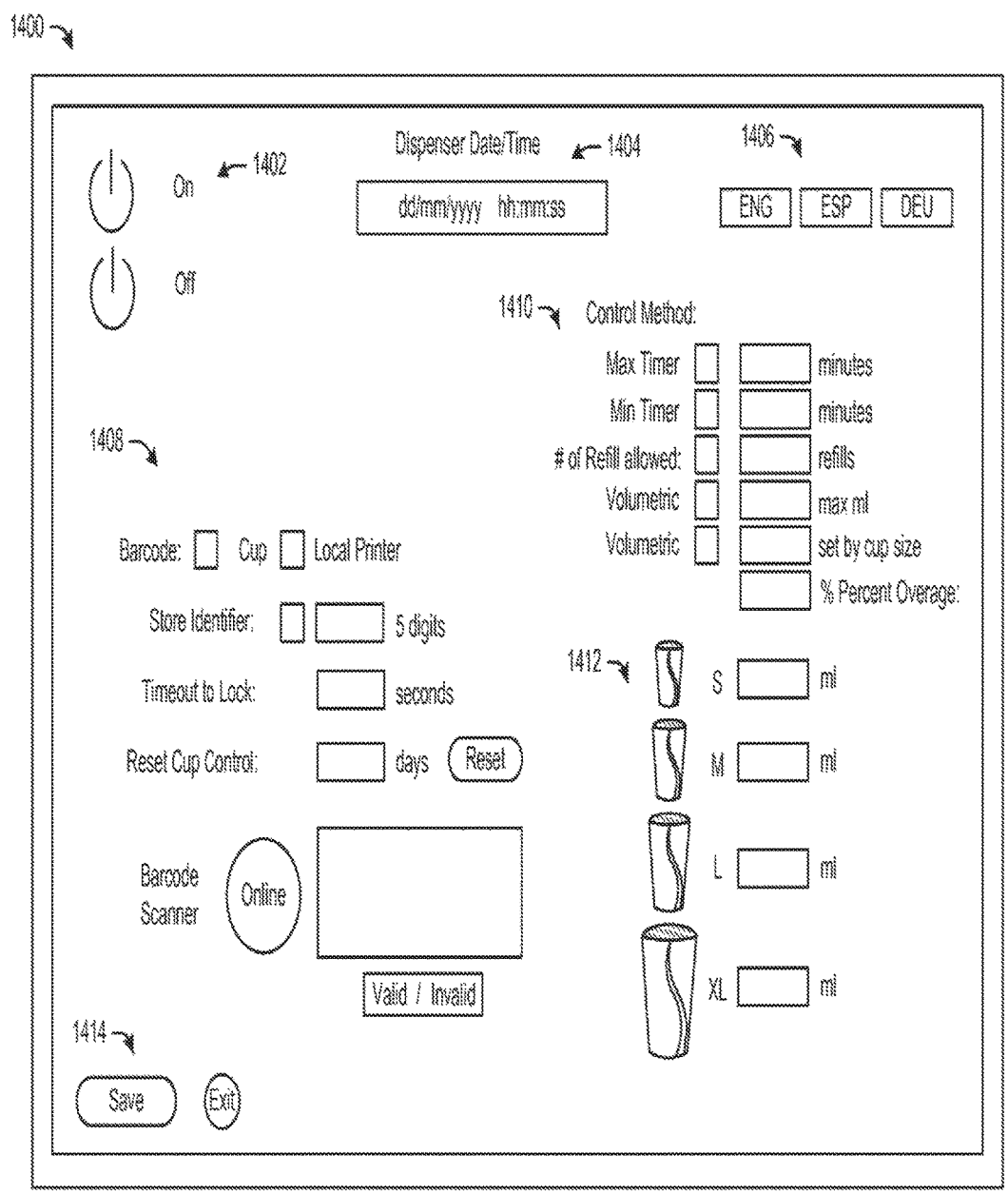
FIG. 14 illustrates an example user interface of a system in accordance with one or more embodiments of the disclosure.

Referring to FIG. 14, an example user interface 1400 for a dispenser system in accordance with one or more embodiments is depicted. The user interface 1400 may include options 1402 to turn controlled access functionality on or off. The user interface 1400 may include date and time options 1404 and language selection options 1406. The user interface 1400 may include barcode related options 1408. For example, the barcode related options 1408 may include selections as to whether the barcodes are preprinted, such as directly on a cup, or are locally printed. Some embodiments may include smart tags or chips, such as RFID tags. Such an option may allow a beverage dispenser to be configured to implement default rules (e.g., when barcodes are printed on a cup, which may indicate recurring barcodes), or custom rules (e.g., when barcodes are locally printed). The barcode related options 1408 may include store or dispenser identification options, which may be associated with dispense events for particular barcodes. The barcode related options 1408 may include timeout to lock options, which may indicate a time after which the user interface 1400 may lock after positive scan of a barcode. The timeout to lock feature may establish a limited user session with the dispenser and may be input at the user interface 1400 as a number of seconds, in one example. The barcode related options 1408 may include cup reset controls that may automatically reset or clear usage records for barcodes after an input length of time. The barcode related options 1408 may include barcode scanner options, which may indicate a status or operational status of a barcode identifier or scanner associated with the dispenser. The user interface 1400 may include control related options 1410. The control related options 1410 may include a maximum timer that may be a maximum length of time or activation timeframe during which refills may be obtained for a certain barcode. The control related options 1410 may include a minimum timer, which may be a minimum length of time in between refills, so as to prevent multiple adjacent refills for a single barcode. The control related options 1410 may include a number of refills allowed indicative of a maximum number of refill events for a barcode. The control related options 1410 may include a volumetric limit indicating a maximum dispensable volume for a barcode across all dispense events of the barcode. The control related options 1410 may include a volumetric limit indicating a maximum dispensable volume during an individual dispense event, which may be set by a cup or vessel size. The control related options 1410 may include a tolerance or percentage overage that is allowed for individual dispense events where the maximum dispensable volume is exceeded, and other options for which control access features or combination of features are to be turned on. The user interface 1400 may include individual cup size options 1412, which may be configured to indicate a volume associated with different cup sizes, and may be used in conjunction with volumetric limits to set dispensing volume controls. For example, a medium cup size may be set to 12 fluid ounces, and a volumetric control may set a maximum dispensable volume to the cup size +10% tolerance. A user may then dispense up to 12 fluid ounces plus an additional 1.2 fluid ounces for a barcode associated with a medium cup size. The user interface 1400 may include save and exit options 1414. Other options and/or configurations, as well as additional or fewer options, may be included in example user interfaces of the disclosure.

Figure 15:
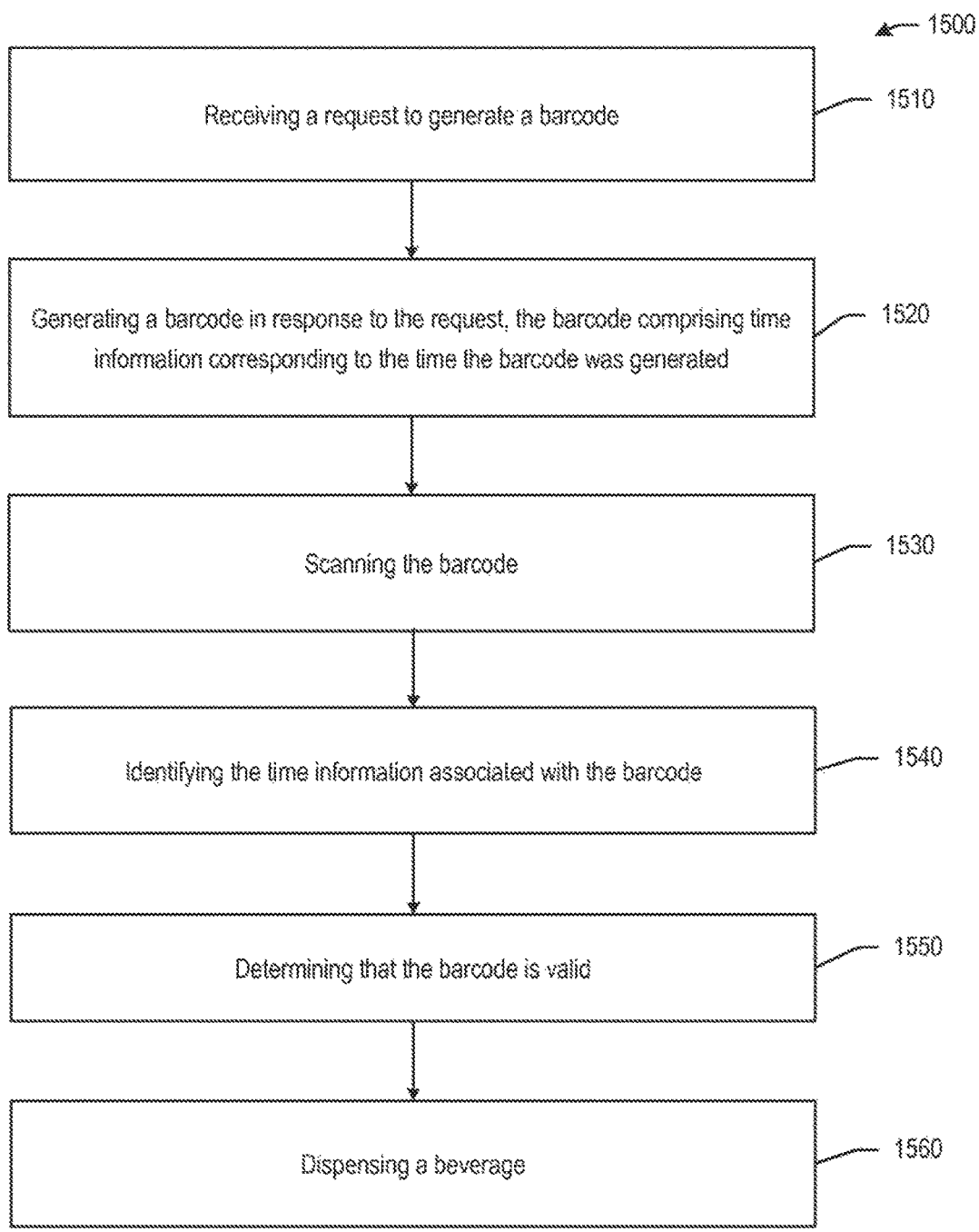
FIG. 15 illustrates an example method in accordance with one or more embodiments of the disclosure.

Referring to FIG. 15, an example method 1500 is illustrated in accordance with one or more embodiments of the disclosure. The method 1500 may include receiving a request to generate a barcode at block 1510. For example, a dispenser may receive an input to generate a barcode. In embodiments where a point of sale device is separate from a dispenser, the point of sale device may receive an input to generate a barcode. Some embodiments may configure RFID tags or other smartchips. At block 1520, the method 1500 includes generating a barcode in response to the request, the barcode comprising time information corresponding to the time the barcode was generated. For example, a dispenser and/or point of sale device may generate a barcode and send the barcode to an associated printer for printing. In other embodiments, a printer may print a barcode in response to an input at the printer. The time information may include the time at which the barcode was generated, an activation timeframe or length of time for which the barcode will be active, a minimum refill time interval, and other time information. In some embodiments, the barcode may further include volume information, such as maximum dispensable volume and/or volume dispensable per dispense event. At block 1530, the method 1500 includes scanning the barcode. For example, a dispenser may scan the barcode with an associated scanner. The method 1500 includes identifying time information associated with the barcode at block 1540. For example, a dispenser may identify time information encoded at the barcode or other time information stored locally or remotely (e.g., at a separate point of sale device). At block 1550, the method 1500 includes determining that the barcode is valid. As described herein, a dispenser may determine an elapsed time between a generation time at which the barcode was generated or an initial dispense time at which the barcode was associated with a dispense event and a current time to determine if the barcode is valid. Block 1560 of the method 1500 includes dispensing a beverage. For example, a dispenser may dispense a beverage upon determining that the barcode is valid at the time of scanning.

Figure 16:
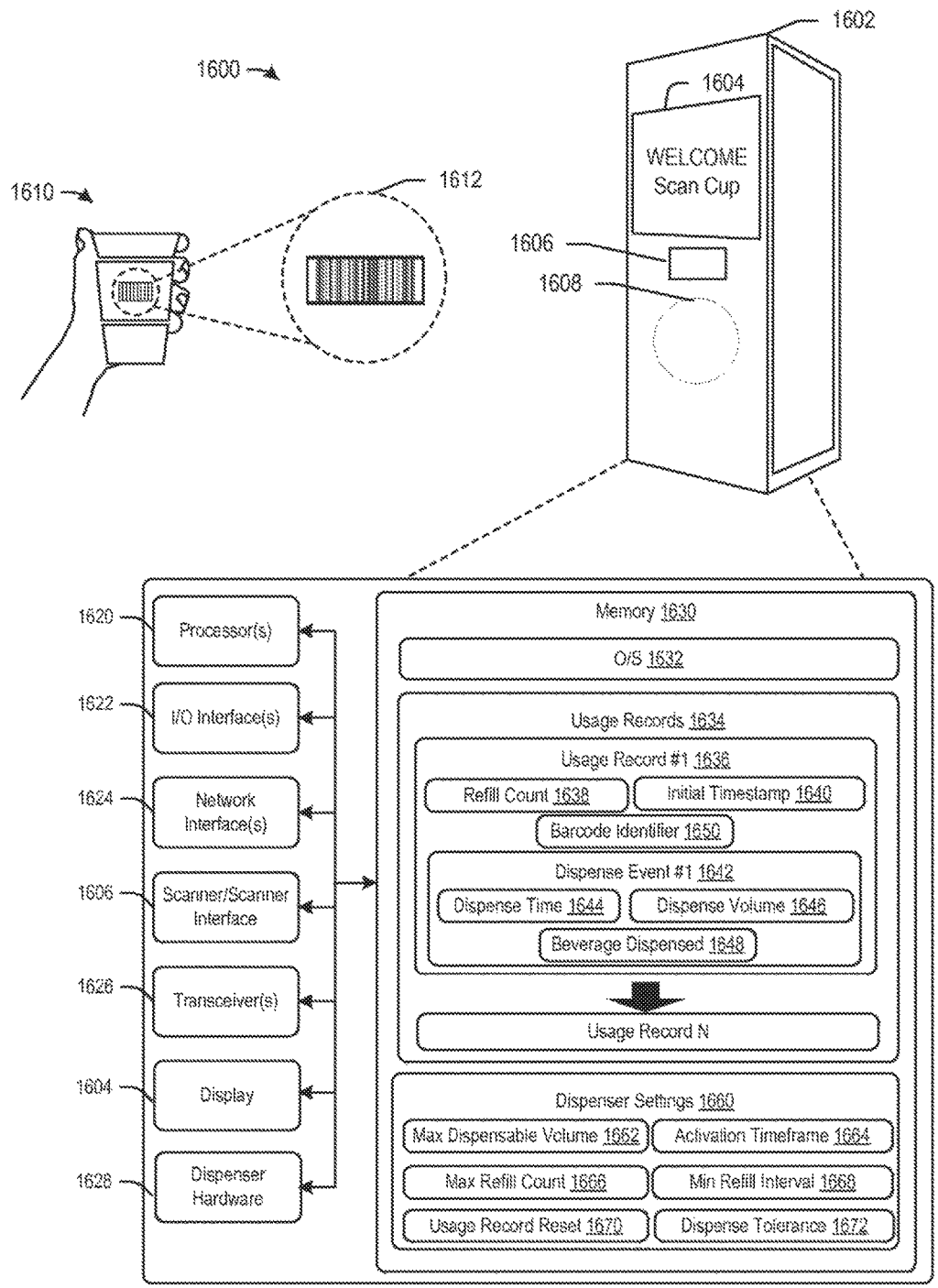
FIG. 16 illustrates an example dispenser system in accordance with one or more embodiments of the disclosure.

Referring to FIG. 16, an example environment 1600 is depicted with a dispenser 1602 and a beverage vessel 1610 in accordance with one or more embodiments. The dispenser 1602 includes a display 1604 that may be configured to present a user interface and/or receive one or more inputs from a user. The dispenser 1602 includes a scanning device 1606 and a dispenser output 1608. The scanning device 1606 may be configured to scan or otherwise read any suitable machine readable code (e.g., QR code, RFID tag, etc.). The dispenser output 1608 may be configured to dispense one or more beverages. The beverage vessel 1610 may include a barcode 1612. The barcode 1612 may be printed directly on the beverage vessel or may be otherwise associated with or attached to the vessel, for example, via a sticker or adhesive. The barcode 1612 may be a barcode or other scannable code. The dispenser 1602 may scan the barcode 1612 via the scanning device 1606.

The dispenser 1602 may include one or more hardware components. In the embodiment of FIG. 16, the dispenser 1602 includes one or more processors 1620, one or more input/output interfaces 1622, one or more network interfaces 1624, the scanning device 1606 and related scanning interfaces, one or more transceivers 1626, the display 1604, and dispenser hardware 1628. The dispenser 1602 may include one or more memory devices 1630. The memory device 1630 may be configured to store computer-executable instructions that, when executed by the one or more processors 1620, cause the dispenser 1602 to perform certain functions. The memory 1630 may include an operating system 1632, one or more usage records 1634, and one or more dispenser settings 1660.

The memory 1630 may include usage records 1636 for one or more barcodes. For example, a first usage record 1636 is depicted in FIG. 16. The first usage record 1636 may be associated with a barcode via a barcode identifier 1650. The first usage record 1636 may include a refill count 1638, an initial timestamp 1640 associated with a first dispense event or generation time, and dispense event information 1642. The dispense event information 1642 may include a dispense time 1644, or time at which the dispense event occurred, a dispense volume 1646 or a volume of beverage dispensed during the dispense event, and a beverage dispensed 1648, or the beverage selected for dispensing during the dispense event. Using the information of the dispense events, the dispenser 1602 may generate total dispensed volumes and other information.

The dispenser settings 1660 may include information such as a maximum dispensable volume 1662 indicative of a maximum volume that can be dispensed across all dispense events associated with a barcode. The dispenser settings 1660 may further include an activation timeframe 1664 indicative of a length of time for which a barcode will remain active or valid after a first dispense event. The dispenser settings 1660 may further include a maximum refill count 1666 indicative of a maximum number of dispense events or refills a barcode may be valid for. The dispenser settings 1660 may further include a minimum refill interval 1668 indicative of a minimum length of time in between refills before a barcode can be used for a subsequent refill. The dispenser settings 1660 may further include a usage record reset 1670 indicative of a time after which one or more usage records may be reset or cleared. The dispenser settings 1660 may further include a dispense tolerance 1672 indicative of a tolerance with respect to dispensable volume for particular barcodes.

One or more operations of the methods or process flows 1100, 1200, 1300, or 1500 may have been described above as being performed by a beverage dispenser, or more specifically, by one or more program modules, applications, or the like executing on such the beverage dispenser. It should be appreciated, however, that any of the operations of methods or process flows 1100, 1200, 1300, or 1500 may be performed, at least in part, in a distributed manner by one or more other devices, or more specifically, by one or more program modules, applications, or the like executing on such devices, for example one or more remote servers in communication with one or more product or beverage dispensers. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods or process flows 1100, 1200, 1300, or 1500 may be described in the context of beverage dispensers, it should be appreciated that such operations may be implemented in connection with numerous other device configurations or devices in communication with a beverage dispenser.

The operations described and depicted in the illustrative methods of FIGS. 11-15 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 11-15 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

In another example method for controlling dispense at beverage dispensers of the disclosure, the method includes accessing, at a beverage dispenser, order information representative of a beverage order from a machine-readable item, the order information comprising a group of order parameters that specify the beverage order. The method may include determining, at a computing device functionally coupled to the beverage dispenser, if the beverage order is valid, and receiving, at the beverage dispenser, selection information indicative of a beverage selection in response to ascertaining that the beverage order is valid, the selection information comprising a group of selection parameters. The method may include determining, at the computing device, if the beverage selection is valid based at least in part on the group of order parameters and the group of selection parameters. The method may include dispensing a beverage at the beverage dispenser based on the selection information in response to ascertaining that the beverage selection is valid. In some embodiments, determining if the beverage selection is valid based at least in part on the group of order parameters and the group of selection parameters may include comparing at least one of the group of order parameters with at least one of the group of selection parameters, configuring the beverage selection as valid in response to the comparing yielding an outcome within a predetermined bound, and configuring the beverage selection as invalid in response to the comparing yielding an outcome exceeding the predetermined bound. The group of order parameters may include one or more of a parameter indicative of type of beverage, a parameter indicative of an amount of beverage, a parameter indicative of a price category for the beverage, or a parameter indicative of a refill allowance for the beverage.

In some embodiments, the method may include determining, at the computing device, if the beverage order is fulfilled in response to the dispensing, where determining if the beverage order is fulfilled may include determining if a predetermined amount of the beverage has been substantially dispensed. The method may include updating, at the computing device, the beverage order in response to dispensing the beverage, where the updating comprising updating a record indicative of an amount of the beverage that is dispensed. The method may include associating, at the computing device, a consumer to the beverage order based on at least a portion of the order information representative of the beverage order. Associating may include accessing information indicative of the consumer.

Accessing may include receiving at least a portion of the information from the machine-readable item, and where at least the portion of the information is securely encoded. The machine-readable item may include a radiofrequency identification (RFID) tag having at least the portion of the information securely encoded thereon, and where the accessing may include probing the RFID tag. Determining if the beverage order is valid may include analyzing an information structure representative of a manufacturer of the RFID tag. The machine-readable item may include a device having at least the portion of the information securely encoded thereon, and where the accessing may include scanning the device. The device may be one of a portable computing device or a portable non-computing device, and at least the portion of the information is encoded on the device according at least to a barcode scheme including one or more of a linear barcode or a matrix barcode, the accessing including scanning at least one of the linear barcode or the matrix barcode.

In an example method of ordering beverages, the method may include receiving an order for a beverage at a computing device functionally coupled to the beverage dispenser, the order comprising one or more of a prepaid amount of the beverage or a predetermined type of the beverage, associating, at the computing device, the order to a consumer of the beverage, and supplying, by the computing device, information indicative of the order and the consumer. The supplying may include communicating at least a portion of the information to a beverage dispenser. The method may include associating, at the computing device, consumer information to the order prior to supplying the information indicative of the order and the consumer, where the consumer information characterizes the consumer. Associating the consumer information to the order may include one or more of associating information indicative of the consumer's age to the order, associating information indicative of a loyalty program pertaining to the consumer to the order, associating information indicative of a consumption restriction to the order, or associating information indicative of a dietary restriction of the consumer to the order.

The method may include associating dispensing information in response to associating information indicative of the consumer's age to the order, where the dispensing information is configured to customize operation of a beverage dispenser configured to dispense the beverage. Supplying may include providing the consumer with a machine-readable item including order information indicative of the order, at least a portion of the order information being securely encoded on the machine-readable item. Providing may include encrypting at least the portion of the order information. Providing may include scrambling at least a portion of the order information. Providing may include providing the consumer with a portable non-computing device, where the portable non-computing device may include a wearable device or a card. Associating may include associating the order to biometric information pertaining to the consumer. Associating the order to the biometric information pertaining to the consumer may include acquiring at least a portion of the biometric information at the computing device, the acquiring may include one or more of scanning a fingerprint of the consumer, scanning a retina of the consumer, recording a consumer's utterance or speech, identifying a facial feature of the consumer, identifying a consumer's gesture, measuring the consumer's height, or measuring the consumer's weight.

In another example method for securing product dispensers of the disclosure, the method may include accessing a configuration mode of a product dispenser, receiving, at the product dispenser, configuration information from a machine-readable item, and synchronizing, at the product dispenser, a first security feature associated with the product dispenser and a second security feature associated with an access device that operates at a remote location from the product dispenser. The first security feature may include an encryption key and the second security feature may include the encryption key, where the synchronizing may include receiving the encryption key from the access device, and configuring the encryption key at the product dispenser. The first security feature may include a scrambling code and the second security feature may include the scrambling code, where the synchronizing may include receiving the scrambling code from the access device, and configuring the scrambling code at the product dispenser.

In one example, a device of the disclosure includes at least one memory device having instructions encoded thereon, and at least one processor functionally coupled to the at least one memory and configured, by the instructions, to receive an order for a beverage, the order comprising one or more of a prepaid amount of the beverage or a predetermined type of the beverage, to associate the order to a consumer of the beverage, and to supply information indicative of the order and the consumer. The at least one processor may be further configured to communicate at least a portion of the information to a beverage dispenser. The at least processor may be further configured to associate consumer information to the order prior to supplying of the information indicative of the order and the consumer, where the consumer information characterizes the consumer. The at least one processor may be further configured to perform one or more of associate information indicative of the consumer's age to the order, associate information indicative of a loyalty program pertaining to the consumer to the order, associate information indicative of a consumption restriction to the order, or associate information indicative of a dietary restriction of the consumer to the order. The at least one processor may be further configured to associate dispensing information in response to associating information indicative of the consumer's age to the order, where the dispensing information is configured to customize operation of a beverage dispenser configured to dispense the beverage. The at least one processor may be further configured to provide the consumer with a machine-readable item including order information indicative of the order, at least a portion of the order information being securely encoded on the machine-readable item. The at least one processor may be further configured to encrypt at least the portion of the order information. The at least one processor may be further configured to scramble at least a portion of the order information. The at least one processor may be further configured to provide the consumer with a portable non-computing device, where the portable non-computing device may include a wearable device or a card. The at least one processor may be further configured to associate the order to biometric information pertaining to the consumer. The at least one processor may be further configured to acquire at least a portion of the biometric information at the computing device, the acquiring may include one or more of scanning a fingerprint of the consumer, scanning a retina of the consumer, recording a consumer's utterance or speech, identifying a facial feature of the consumer, identifying a consumer's gesture, measuring the consumer's height, or measuring the consumer's weight.

In one example of a product dispenser of the disclosure, the product dispenser includes an acquisition unit configured to access order information representative of a product order from a machine-readable item, the order information comprising a group of order parameters that specify the beverage order, a control unit configured to determine if the product order is valid, an interface configured to receive selection information indicative of a product selection in response to the beverage order being valid, the selection information comprising a group of selection parameters, the control unit further configured to determine if the product selection is valid based at least in part on the group of order parameters and the group of selection parameters, and a dispenser platform configured to dispense a product at the product dispenser based on the selection information in response to the beverage selection being valid. The control unit may be configured to compare at least one of the group of order parameters with at least one of the group of selection parameters, to configure the product selection as valid in response to an outcome of the comparison being within a predetermined bound, and to configure the beverage selection as invalid in response to the outcome of the comparison being greater than the predetermined bound. The group of order parameters may include one or more of a parameter indicative of type of beverage, a parameter indicative of an amount of beverage, a parameter indicative of a price category for the beverage, or a parameter indicative of a refill allowance for the beverage. The control unit may be further configured to determine if the beverage order is fulfilled in response to the product being dispensed, and where the control unit may be configured to determine if a predetermined amount of the product has been substantially dispensed. The control unit may be further configured to update the beverage order in response to the product being dispensed, and where the control unit may be configured to update a record indicative of an amount of the product that is dispensed. The control unit may be further configured to associate a consumer to the product order based on at least a portion of the order information representative of the product order. The control unit may be further configured to access information indicative of the consumer. The control unit may be further configured to receive at least a portion of the information from the machine-readable item, and where at least the portion of the information is securely encoded. The machine-readable item may include a radio frequency identification (RFID) tag having at least the portion of the information securely encoded thereon, and where the acquiring may include probing the RFID tag. The control unit may be further configured to analyze an information structure representative of a manufacturer of the RFID tag. The machine-readable item may include a device having at least the portion of the information securely encoded thereon, and where the acquisition unit may be configured to scan the device. The device may be one of a portable computing device or a portable non-computing device, where at least the portion of the information is encoded on the device according at least to a barcode scheme including one or more of a linear barcode or a matrix barcode, the acquisition unit may be configured to scan at least one of the linear barcode or the matrix barcode.

Certain embodiments of the disclosure may include at least one computer-accessible non-transitory storage medium having instructions for product dispense encoded thereon that, in response to execution, cause at least one electronic device to perform operations including accessing order information representative of a beverage order from a machine-readable item, the order information comprising a group of order parameters that specify the beverage order, determining if the beverage order is valid, receiving selection information indicative of a beverage selection in response to ascertaining that the beverage order is valid, the selection information comprising a group of selection parameters, determining if the beverage selection is valid based at least in part on the group of order parameters and the group of selection parameters, and dispensing a beverage at the beverage dispenser based on the selection information in response to ascertaining that the beverage selection is valid. Determining if the beverage selection is valid based at least in part on the group of order parameters and the group of selection parameters may include comparing at least one of the group of order parameters with at least one of the group of selection parameters, configuring the beverage selection as valid in response to the comparing yielding an outcome within a predetermined bound, and configuring the beverage selection as invalid in response to the comparing yielding an outcome exceeding the predetermined bound. The group of order parameters may include one or more of a parameter indicative of type of beverage, a parameter indicative of an amount of beverage, a parameter indicative of a price category for the beverage, or a parameter indicative of a refill allowance for the beverage. The at least one computer-accessible non-transitory storage medium may further perform operations including determining, at the computing device, if the beverage order is fulfilled in response to the dispensing, where determining if the beverage order is fulfilled may include determining if a predetermined amount of the beverage has been substantially dispensed. The at least one computer-accessible non-transitory storage medium may further perform operations including updating, at the computing device, the beverage order in response to dispensing the beverage, where the updating comprising updating a record indicative of an amount of the beverage that is dispensed. The at least one computer-accessible non-transitory storage medium may further perform operations including associating, at the computing device, a consumer to the beverage order based on at least a portion of the order information representative of the beverage order. The associating may include accessing information indicative of the consumer. The accessing may include receiving at least a portion of the information from the machine-readable item, and where at least the portion of the information is securely encoded. The machine-readable item may include a radio frequency identification (RFID) tag having at least the portion of the information securely encoded thereon, and where the accessing may include probing the RFID tag. Determining if the beverage order is valid may include analyzing an information structure representative of a manufacturer of the RFID tag. The machine-readable item may include a device having at least the portion of the information securely encoded thereon, and where the accessing may include scanning the device. The device may be one of a portable computing device or a portable non-computing device, and where at least the portion of the information is encoded on the device according at least to a barcode scheme including one or more of a linear barcode or a matrix barcode, the accessing comprising scanning at least one of the linear barcode or the matrix barcode.

Certain embodiments of the disclosure may include at least one computer-accessible non-transitory storage medium having instructions for product ordering encoded thereon that, in response to execution, cause at least one computing device to perform operations including receiving an order for a beverage, the order comprising one or more of a prepaid amount of the beverage or a predetermined type of the beverage, associating the order to a consumer of the beverage, and supplying information indicative of the order and the consumer. The supplying may include communicating at least a portion of the information to a beverage dispenser. The at least one computer-accessible non-transitory storage medium may further perform operations including associating consumer information to the order prior to supplying the information indicative of the order and the consumer, where the consumer information characterizes the consumer. Associating the consumer information to the order may include one or more of associating information indicative of the consumer's age to the order, associating information indicative of a loyalty program pertaining to the consumer to the order, associating information indicative of a consumption restriction to the order, or associating information indicative of a dietary restriction of the consumer to the order. The at least one computer-accessible non-transitory storage medium may further perform operations including associating dispensing information in response to associating information indicative of the consumer's age to the order, the dispensing information is configured to customize operation of a beverage dispenser configured to dispense the beverage. Supplying may include providing the consumer with a machine-readable item including order information indicative of the order, at least a portion of the order information being securely encoded on the machine-readable item. Providing may include encrypting at least the portion of the order information. Providing may further include scrambling at least a portion of the order information. Providing may further include providing the consumer with a portable non-computing device, where the portable non-computing device may include a wearable device or a card. Associating may include associating the order to biometric information pertaining to the consumer. Associating the order to the biometric information pertaining to the consumer may include acquiring at least a portion of the biometric information at the computing device, the acquiring may include one or more of scanning a fingerprint of the consumer, scanning a retina of the consumer, recording a consumer's utterance or speech, identifying a facial feature of the consumer, measuring the consumer's height, or measuring the consumer's weight.

In one example of a system for product dispense, the system may include a product dispenser configured to access order information representative of a product order from a machine-readable item, the order information comprising a group of order parameters that specify the beverage order, and a hub unit configured to determine if the product order is valid, the product dispenser further configured to receive selection information indicative of a product selection in response to the beverage order being valid, the selection information comprising a group of selection parameters, the hub unit further configured to determine if the product selection is valid based at least in part on the group of order parameters and the group of selection parameters, and the product dispenser further configured to dispense a product based on the selection information in response to the beverage selection being valid.

Certain embodiments of the disclosure may include a device comprising at least one processor functionally coupled to at least one memory, where the at least one memory may include computer-accessible instructions, and where the at least one processor is configured, by at least a portion of the computer-accessible instructions, to carry out any of the methods described and/or claimed herein.

Certain embodiments of the disclosure may include a product dispenser comprising at least one device and at least one processor functionally coupled to at least one memory, where the at least one memory may include computer-accessible instructions, and where the at least one device and/or the at least one processor is configured, by at least a portion of the computer-accessible instructions, to carry out any of the methods described and/or claimed herein.

Certain embodiments of the disclosure may include a system comprising at least one product dispenser and at least one device functionally coupled to the at least one product dispenser, where the at least one device and/or the at least one product dispenser is arranged to carry out any of the methods described and/or claimed herein.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface," "unit," "module," and "pipe" can be utilized interchangeably and can be referred to collectively as functional elements.

In this specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in this specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in this specification and annexed drawings includes examples of systems, devices, and techniques that can provide regulation of product dispense in a self-serve environment. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A beverage dispenser system comprising:
   a dispenser;
   at least one memory that stores computer-executable instructions; and
   at least one processor configured to access the at least one memory and execute the computer-executable instructions to:
      identify a first barcode associated with a beverage vessel;
      identify a usage record associated with the first barcode, the usage record indicative of a first dispense event associated with the first barcode including a first dispensed beverage volume associated with the first dispense event;
      determine that the first barcode is valid based at least in part on the usage record;
      after determining that the first barcode is valid, receive a first selection of a first beverage to dispense;
      dispense the first beverage during a second dispense event via the dispenser;
      associate the second dispense event including a second dispensed beverage volume associated with the second dispensed event with the usage record;
      receive a second selection of a second beverage to dispense;
      identify the usage record associated with the first barcode;
      determine a total volume of dispensed beverage associated with the first barcode based at least in part on the usage record;
      determine that the total volume of dispensed beverage exceeds a maximum dispensed beverage volume value associated with the first barcode, the total volume of dispensed beverage comprising the first dispensed beverage volume and the second dispensed beverage volume; and
      prevent dispensing of the second beverage.

2. The beverage dispenser system of claim 1, wherein the usage record further comprises a first timestamp associated with the first dispense event and a second timestamp associated with the second dispensed event.

3. The beverage dispenser system of claim 1, wherein the at least one processor is further configured to access the at least one memory and execute the computer-executable instructions to automatically deactivate the first barcode at an end of an activation timeframe.

4. The beverage dispenser system of claim 1, wherein the at least one processor is further configured to access the at least one memory and execute the computer-executable instructions to reset the usage record associated with the first barcode a predetermined time interval after the first dispense event.

5. The beverage dispenser system of claim 1, wherein the at least one processor is further configured to access the at least one memory and execute the computer-executable instructions to:
   determine a dispensable volume associated with the beverage vessel; and
   automatically end the second dispense event upon dispensing the dispensable volume of the first beverage.

6. A method, comprising:
   identifying, by a computer system comprising one or more processors coupled to at least one memory, a first barcode associated with a beverage vessel;
   identifying, by the computer system, a usage record associated with the first barcode, the usage record indicative of a first dispense event including a first dispensed beverage volume associated with the first dispense event;
   determining, by the computer system, that the first barcode is valid based at least in part on the usage record;
   receiving, by the computer system, a first selection of a first beverage to dispense;
   dispensing, by the computer system, the first beverage during a second dispense event;
   associating, by the computer system, the second dispense event including a second dispensed beverage volume associated with the second dispensed event with the usage record;
   receiving, by the computer system, a second selection of a second beverage to dispense;
   identifying, by the computer system, the usage record associated with the first barcode;
   determining, by the computer system, a total volume of dispensed beverage associated with the first barcode based at least in part on the usage record;
   determining, by the computer system, that the total volume of dispensed beverage meets a maximum dispensed beverage volume value associated with the first barcode, the total volume of dispensed beverage comprising the first dispensed beverage volume and the second dispensed beverage volume; and
   preventing, by the computer system, dispensing of the second beverage.

7. The method of claim 6, wherein the usage record further comprises a first timestamp associated with the first dispense event and a second timestamp associated with the second dispensed event.

8. The method of claim 6, further comprising automatically deactivating, by the computer system, the first barcode at an end of an activation timeframe.

9. The method of claim 6, further comprising resetting, by the computer system, the usage record associated with the first barcode a predetermined time interval after the first dispense event.

10. The method of claim 6, further comprising:
    determining, by the computer system, a dispensable volume associated with the beverage vessel; and automatically ending, by the computer system, the second dispense event upon dispensing the dispensable volume of the first beverage.

\* \* \* \* \*